(12) United States Patent
Arnitz et al.

(10) Patent No.: US 10,770,931 B2
(45) Date of Patent: Sep. 8, 2020

(54) WIRELESS ENERGY TRANSFER SYSTEMS FOR NETWORKS OF INTERLINKED PRESCRIBED PATHS

(71) Applicant: Searete LLC, Bellevue, WA (US)

(72) Inventors: Daniel Arnitz, Seattle, WA (US); Lawrence F. Arnstein, Seattle, WA (US); Joseph Hagerty, Seattle, WA (US); Guy S. Lipworth, Seattle, WA (US)

(73) Assignee: The Invention Science Fund I LLC, Bellevue, WA (US)

(*) Notice: Subject to any disclaimer, the term of this patent is extended or adjusted under 35 U.S.C. 154(b) by 150 days.

(21) Appl. No.: 16/142,754

(22) Filed: Sep. 26, 2018

(65) Prior Publication Data
US 2020/0099259 A1 Mar. 26, 2020

(51) Int. Cl.
H02J 50/90 (2016.01)
H02J 50/80 (2016.01)
H02J 50/40 (2016.01)
H02J 50/27 (2016.01)

(52) U.S. Cl.
CPC ............. *H02J 50/90* (2016.02); *H02J 50/27* (2016.02); *H02J 50/40* (2016.02); *H02J 50/80* (2016.02)

(58) Field of Classification Search
CPC .. H02J 50/90; H02J 50/80; H02J 50/27; H02J 50/40
See application file for complete search history.

(56) References Cited

U.S. PATENT DOCUMENTS

| | | |
|---|---|---|
| 2010/0315045 A1 | 12/2010 | Zeine |
| 2014/0354036 A1 | 2/2014 | Koo |
| 2017/0077736 A1 | 3/2017 | Leabman |
| 2018/0323657 A1 | 11/2018 | Hannigan et al. |
| 2019/0074881 A1* | 3/2019 | Urzhumov ............... H01Q 3/14 |
| 2019/0356177 A1 | 11/2019 | Swan |
| 2020/0028384 A1 | 1/2020 | Murata et al. |
| 2020/0044482 A1 | 2/2020 | Partovi et al. |

* cited by examiner

Primary Examiner — Robert L Deberadinis

(57) ABSTRACT

According to various embodiments, systems and methods for wirelessly transmitting energy to a moving wireless power receiver in a network of interlinked prescribed paths. A position of a wireless power receiver in a network of interlinked prescribed paths is tracked as the wireless power receiver traverses one or more prescribed paths in the network of interlinked prescribed paths. Energy is wirelessly transmitted from one or more wireless power transmitters to the wireless power receiver based on the position of the wireless power receiver in the network of interlinked prescribed paths. Specifically, the energy is wirelessly transmitted to the wireless power receiver based on the position of the wireless power receiver in the network of interlinked prescribed paths as the wireless power receiver traverses the one or more prescribed paths in the network of interlinked prescribed paths.

43 Claims, 19 Drawing Sheets

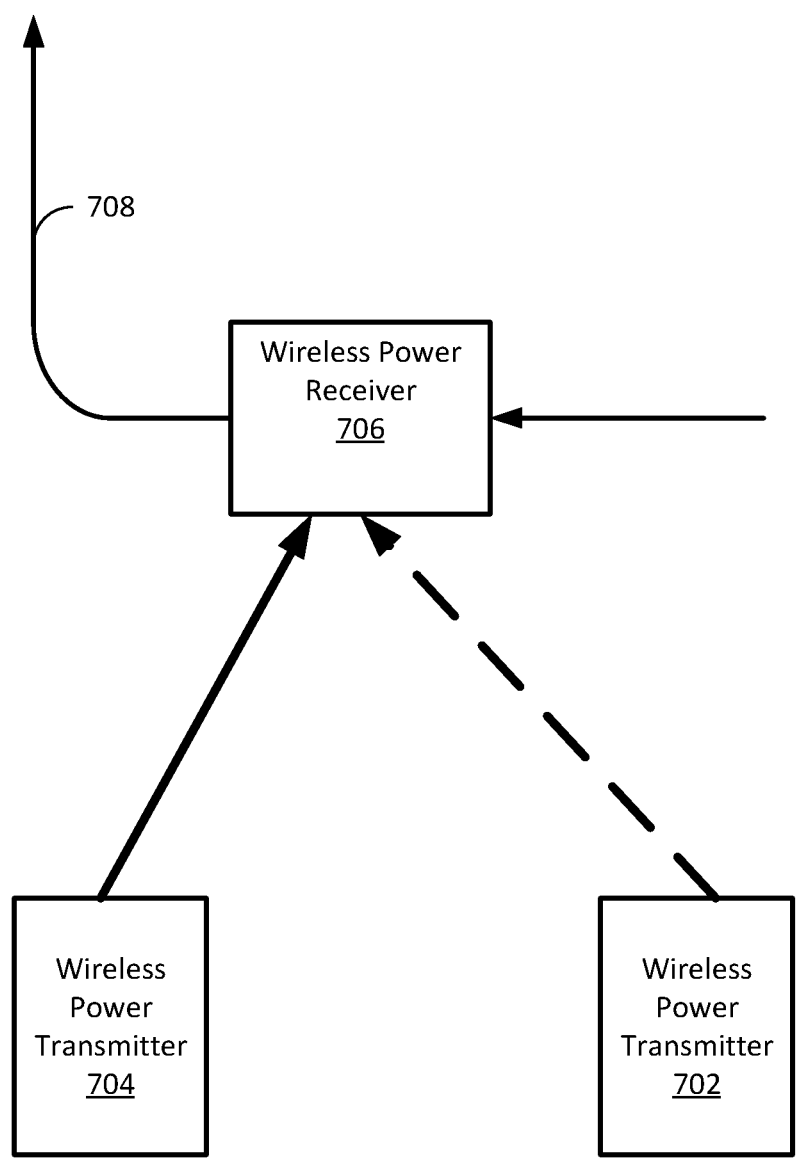

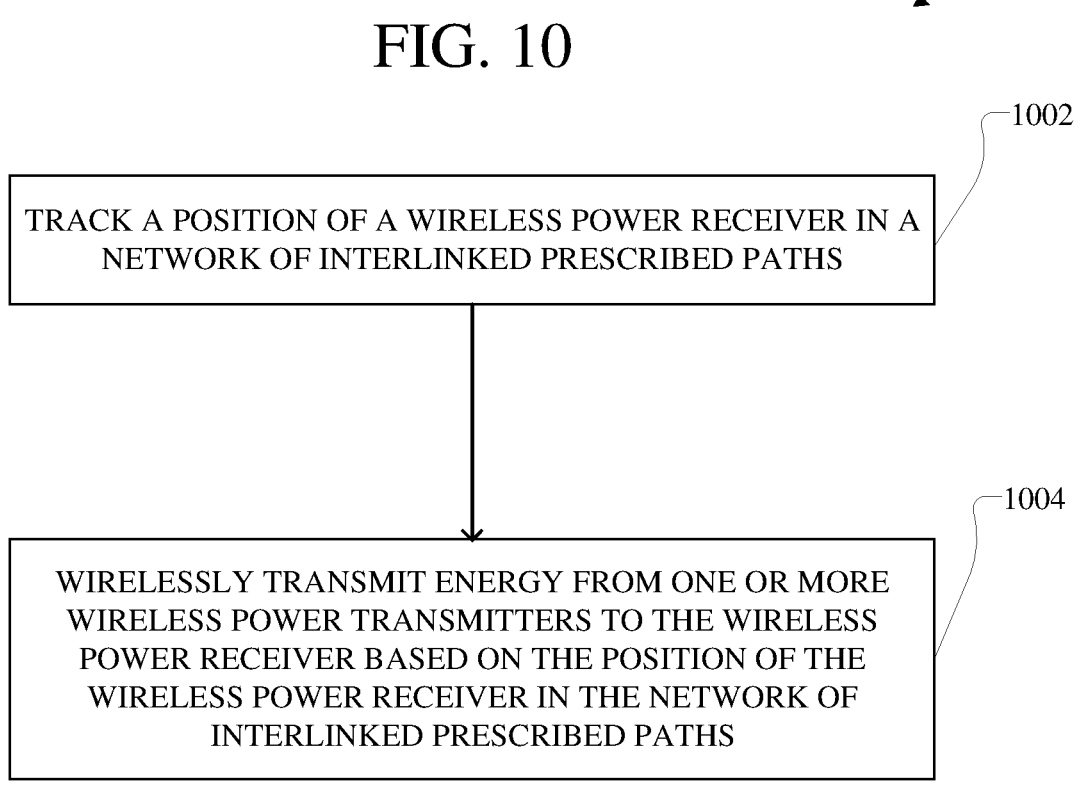

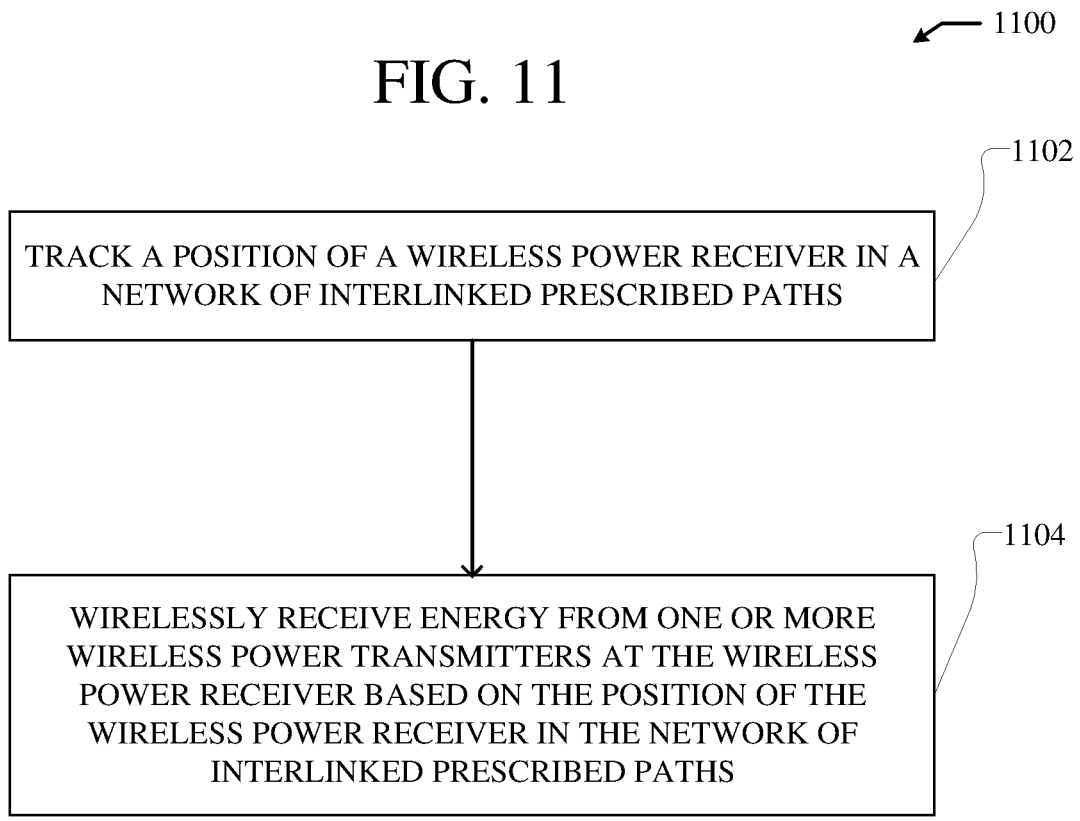

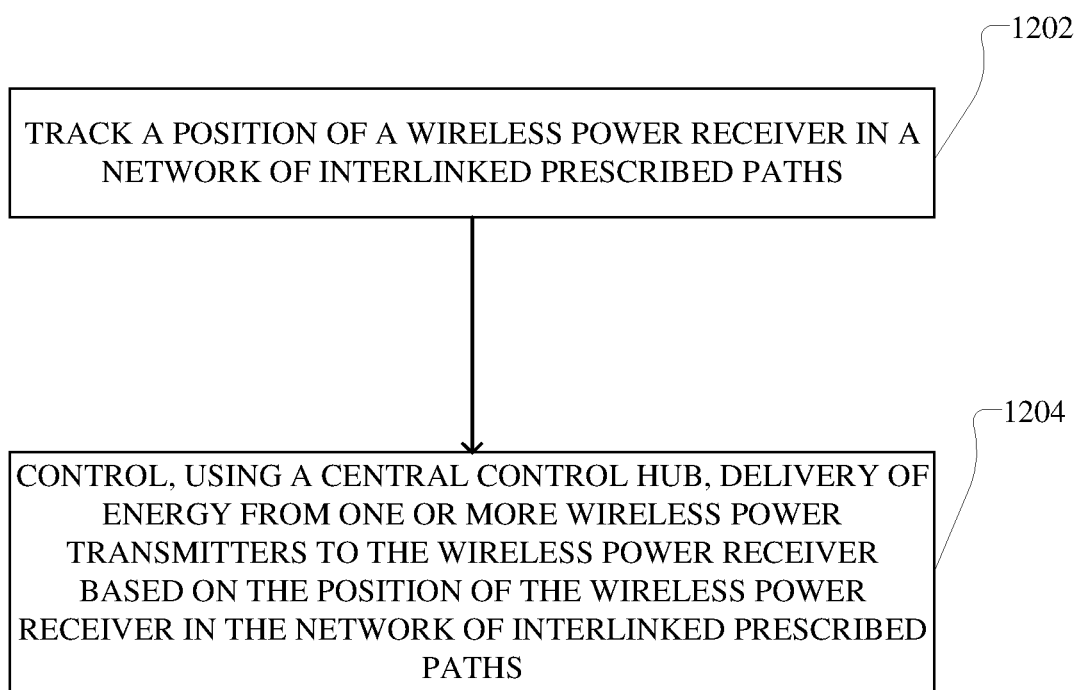

WIRELESS ENERGY TRANSFER SYSTEMS FOR NETWORKS OF INTERLINKED PRESCRIBED PATHS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application. All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This disclosure relates to wirelessly transmitting energy to a wireless power receiver as the wireless power receiver traverses a network of interlinked prescribed paths. Specifically, this disclosure relates to wirelessly transmitting energy to a wireless power receiver based on a position of the wireless power receiver in a network of interlinked prescribed paths as the wireless power receiver traverses one or more prescribed paths in the network of interlinked prescribed paths.

SUMMARY

According to various embodiments, a position of a wireless power receiver in a network of interlinked prescribed paths is tracked as the wireless power receiver traverses one or more prescribed paths in the network of interlinked prescribed paths. Further, energy can be wirelessly transmitted from one or more wireless power transmitters to the wireless power receiver based on the position of the wireless power receiver in the network of interlinked prescribed paths as the wireless power receiver traverses the one or more prescribed paths in the network of interlinked prescribed paths.

In certain embodiments, a system includes one or more wireless power transmitters for wirelessly transmitting energy to a wireless power receiver. The one or more wireless power transmitters are configured to wireless transmit energy to the wireless power receiver based on a position of the wireless power receiver in a network of interlinked prescribed paths. The position of the wireless power receiver is tracked as the wireless power receiver traverses one or more prescribed paths in the network of interlinked prescribed paths for purposes of wirelessly transmitting the energy to the wireless power receiver.

In various embodiments, a position of a wireless power receiver in a network of interlinked prescribed paths is tracked as the wireless power receiver traverses one or more prescribed paths in the network of interlinked prescribed paths. The wireless power receiver can receive energy from one or more wireless power transmitters based on the position of the wireless power receiver in the network of interlinked prescribed paths. Specifically, the wireless power receiver can receive energy from one or more wireless power transmitters based on the position of the wireless power receiver as the wireless power receiver traverses one or more prescribed paths in the network of interlinked prescribed paths.

In certain embodiments, a system includes a wireless power receiver for wirelessly receiving energy. The wireless power receiver is configured to wirelessly receive energy based on a position of the wireless power receiver in a network of interlinked prescribed paths. Specifically, the wireless power receiver can wirelessly receive energy based on the position of the wireless power receiver as the wireless power receiver traverses one or more prescribed paths in the network of interlinked prescribed paths.

In various embodiments, a position of a wireless power receiver in a network of interlinked prescribed paths is tracked as the wireless power receiver traverses one or more prescribed paths in the network of interlinked prescribed paths. A central control hub for the network of interlinked prescribed paths can control wireless delivery of energy to the wireless power receiver from one or more wireless power transmitters based on the position of the wireless power receiver in the network of interlinked prescribed paths. Specifically, the central control hub can control wireless delivery of energy to the wireless power receiver based on the position of the wireless power receiver as the wireless power receiver traverses one or more prescribed paths in the network of interlinked prescribed paths.

In certain embodiments, a system includes a central control hub for a network of interlinked prescribed paths. The central control hub is configured to control wireless delivery of energy to a wireless power receiver from one or more wireless power transmitters based on a position of the wireless power receiver in the network of interlinked prescribed paths. Specifically, the central control hub can control wireless delivery of energy to the wireless power receiver based on the position of the wireless power receiver that is tracked as the wireless power receiver traverses one or more prescribed paths in the network of interlinked prescribed paths.

BRIEF DESCRIPTION OF THE DRAWINGS

FIG. 7 illustrates another example system for transmitting and receiving energy wirelessly.

FIG. 10 is a flowchart of an example method for wirelessly transmitting energy to a wireless power receiver in a network of interlinked prescribed paths.

FIG. 11 is a flowchart of an example method for wirelessly receiving energy at a wireless power receiver in a network of interlinked prescribed paths.

FIG. 12 is a flowchart of an example method for controlling wireless delivery of energy using a central control hub of a network of interlinked prescribed paths.

DETAILED DESCRIPTION

Figure 1:
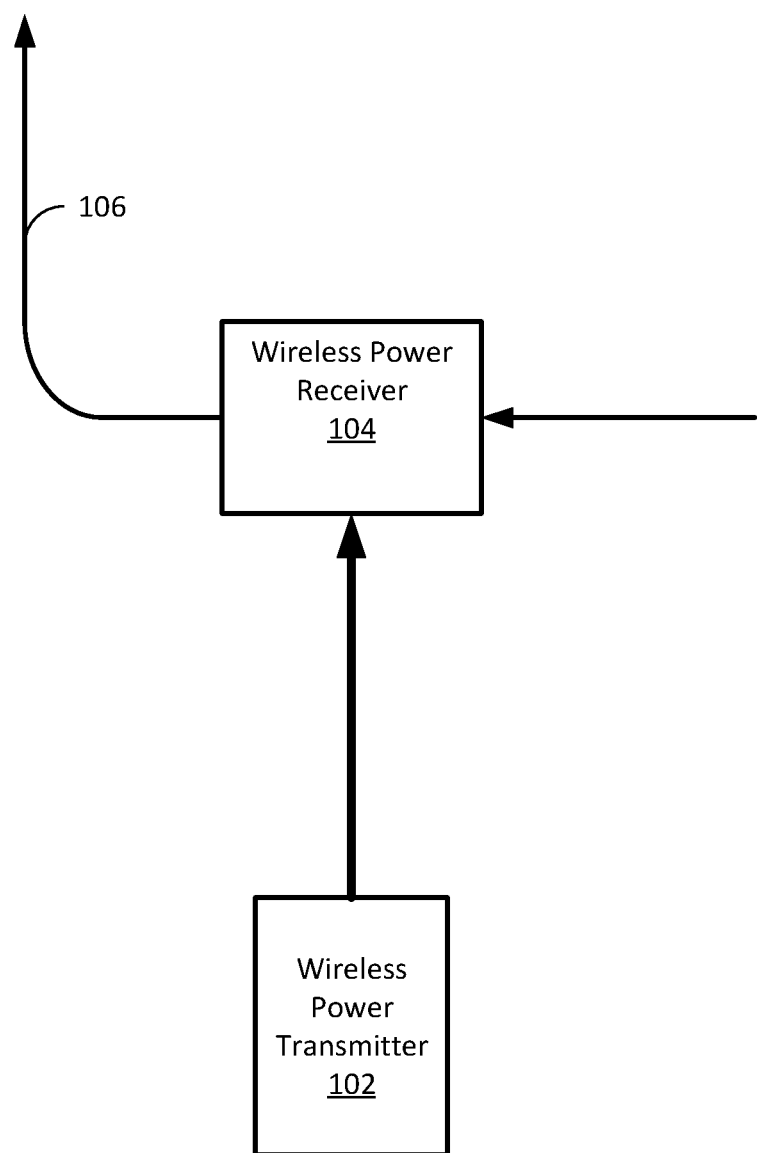
FIG. 1 illustrates an example system for transmitting and receiving energy wirelessly.

According to various embodiments, a position of a wireless power receiver in a network of interlinked prescribed paths is tracked as the wireless power receiver traverses one or more prescribed paths in the network of interlinked prescribed paths. Further, energy can be wirelessly transmitted from one or more wireless power transmitters to the wireless power receiver based on the position of the wireless power receiver in the network of interlinked prescribed paths as the wireless power receiver traverses the one or more prescribed paths in the network of interlinked prescribed paths.

In certain embodiments, a system includes one or more wireless power transmitters for wirelessly transmitting energy to a wireless power receiver. The one or more wireless power transmitters are configured to wireless transmit energy to the wireless power receiver based on a position of the wireless power receiver in a network of interlinked prescribed paths. The position of the wireless power receiver is tracked as the wireless power receiver traverses one or more prescribed paths in the network of interlinked prescribed paths for purposes of wirelessly transmitting the energy to the wireless power receiver.

In various embodiments, a position of a wireless power receiver in a network of interlinked prescribed paths is tracked as the wireless power receiver traverses one or more prescribed paths in the network of interlinked prescribed paths. The wireless power receiver can receive energy from one or more wireless power transmitters based on the position of the wireless power receiver in the network of interlinked prescribed paths. Specifically, the wireless power receiver can receive energy from one or more wireless power transmitters based on the position of the wireless power receiver as the wireless power receiver traverses one or more prescribed paths in the network of interlinked prescribed paths.

In certain embodiments, a system includes a wireless power receiver for wirelessly receiving energy. The wireless power receiver is configured to wirelessly receive energy based on a position of the wireless power receiver in a network of interlinked prescribed paths. Specifically, the wireless power receiver can wirelessly receive energy based on the position of the wireless power receiver as the wireless power receiver traverses one or more prescribed paths in the network of interlinked prescribed paths.

In various embodiments, a position of a wireless power receiver in a network of interlinked prescribed paths is tracked as the wireless power receiver traverses one or more prescribed paths in the network of interlinked prescribed paths. A central control hub for the network of interlinked prescribed paths can control wireless delivery of energy to the wireless power receiver from one or more wireless power transmitters based on the position of the wireless power receiver in the network of interlinked prescribed paths. Specifically, the central control hub can control wireless delivery of energy to the wireless power receiver based on the position of the wireless power receiver as the wireless power receiver traverses one or more prescribed paths in the network of interlinked prescribed paths.

In certain embodiments, a system includes a central control hub for a network of interlinked prescribed paths. The central control hub is configured to control wireless delivery of energy to a wireless power receiver from one or more wireless power transmitters based on a position of the wireless power receiver in the network of interlinked prescribed paths. Specifically, the central control hub can control wireless delivery of energy to the wireless power receiver based on the position of the wireless power receiver that is tracked as the wireless power receiver traverses one or more prescribed paths in the network of interlinked prescribed paths.

The example wireless power receivers described herein can be configured to wirelessly receive energy through RF signals. Specifically, the wireless power receivers can generate power from received RF energy as part of wirelessly receiving energy using the RF signals. More specifically, the wireless power receivers can generate, from received RF energy, direct current voltage to power devices coupled to or incorporating the wireless power receivers.

As will be discussed in greater detail later, the wireless power receivers described herein can receive RF energy as part of a steerable beam of RF energy, e.g. as part of an energy carrying signal at a specific RF frequency or within a specific RF frequency band. Specifically, received RF energy can be received at a wireless power receiver through a beam of RF energy steered using a phased array of antennas. A beam of RF energy received by a wireless power receiver, e.g. a beam of energy used to transmit power, can be steered based on a position of the wireless power receiver. More specifically, a wireless power receiver can move and a beam of RF energy received at the wireless power receiver can be steered towards the wireless power receiver as it moves, e.g. in a network of interlinked prescribed paths.

The example wireless power transmitters described herein can be configured to wirelessly transmit energy through RF signals. Specifically, the wireless power transmitters can transmit power through RF signals by transmitting energy using the RF signals that can subsequently be used to generate the power. More specifically, the wireless power transmitters can transmit RF energy that is used to generate direct current voltage to power devices coupled to or incorporating a wireless power receiver.

As will be discussed in greater detail later, the wireless power transceivers described herein can transmit RF energy as part of a steerable beam of RF energy. For example, the wireless power transceivers described herein can transmit energy as part of an energy carrying signal at a specific RF frequency or within a specific RF frequency band. Specifically, RF energy can be transmitted by a wireless power transmitter through a beam of RF energy steered using a phased array of antennas. A beam of RF energy transmitted by a wireless power transmitter, e.g. a beam of energy used to transmit power, can be steered based on a position of a wireless power receiver. More specifically, a wireless power receiver can move and a beam of RF energy transmitted to the wireless power receiver can be steered by a wireless power transmitter towards the wireless power receiver as it moves, e.g. in a network of interlinked prescribed paths.

Some of the infrastructure that can be used with embodiments disclosed herein is already available, such as general-purpose computers, antennas, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates an example system 100 for transmitting and receiving energy wirelessly. The system 100 includes a wireless power transmitter 102 and a wireless power receiver 104. The wireless power transmitter 102 functions according to an applicable device for wirelessly transmitting energy, e.g. as part of wirelessly transmitting power, such as the wireless power transmitters described herein. Specifically, the wireless power transmitter 102 can wirelessly transmit energy through a beam of energy, e.g. RF energy. Further, the wireless power transmitter 102 can transmit energy through a steerable beam of RF energy, e.g. as part of an energy carrying signal at a specific RF frequency or within a specific RF frequency band. Specifically, the wireless power transmitter 102 can transmit RF energy in a steerable beam using a phased array of antennas.

The wireless power transmitters described herein, including the wireless power transmitter 102, can transmit multiple beams of energy, e.g. for purposes of wirelessly transmitting power. Specifically, the wireless power transmitters described herein can each simultaneously broadcast multiple beams of energy, e.g. for purposes of wirelessly transmitting power to one or more wireless power receivers. For example, the wireless power transmitter 102 can simultaneously broadcast a first beam of energy and a second beam energy for wirelessly transmitting energy to a wireless power receiver. In another example, the wireless power transmitter 102 can simultaneously broadcast a first beam of energy for wirelessly transmitting energy to a first wireless power receiver and a second beam of energy for wirelessly transmitting energy to a second wireless power receiver.

The wireless power receiver 104 functions to receive energy wirelessly from the wireless power transmitter 102, e.g. as part of wirelessly receiving power. The wireless power receiver 104 can move as it receives wireless energy. Specifically, the wireless power receiver 104 can be configured to move itself or integrated as part of a moveable device for moving the wireless power receiver 104 as the wireless power receiver 104 receives wireless energy. The wireless power receiver 104 can move terrestrially. For example, the wireless power receiver 104 can be integrated as part of a land vehicle for movement along land. Further, the wireless power receiver 104 can move aerially. For example, the wireless power receiver 104 can be a drone that is configured to fly through the air.

The wireless power receiver 104 can move along a network of interlinked prescribed paths 106. A prescribed path, as used herein, can include a pre-defined path or route that is known before a wireless power receiver traverses all or a portion of the path. For example, a portion of a prescribed path can include a 45° turn twenty feet from the beginning of the path, which is known before a wireless power receiver makes the turn in traversing the prescribed path. While the network of interlinked prescribed paths 106 shown in FIG. 1 is curved, in various embodiments, the network of interlinked prescribed paths 106 can include an applicable number of either or both curved and straight prescribed paths. A prescribed path in a network of interlinked prescribed paths can be represented along one dimension in three-dimensional Euclidian space, along two dimensions in three-dimensional Euclidian space, or along three dimensions in three-dimensional Euclidian space.

Figure 2:
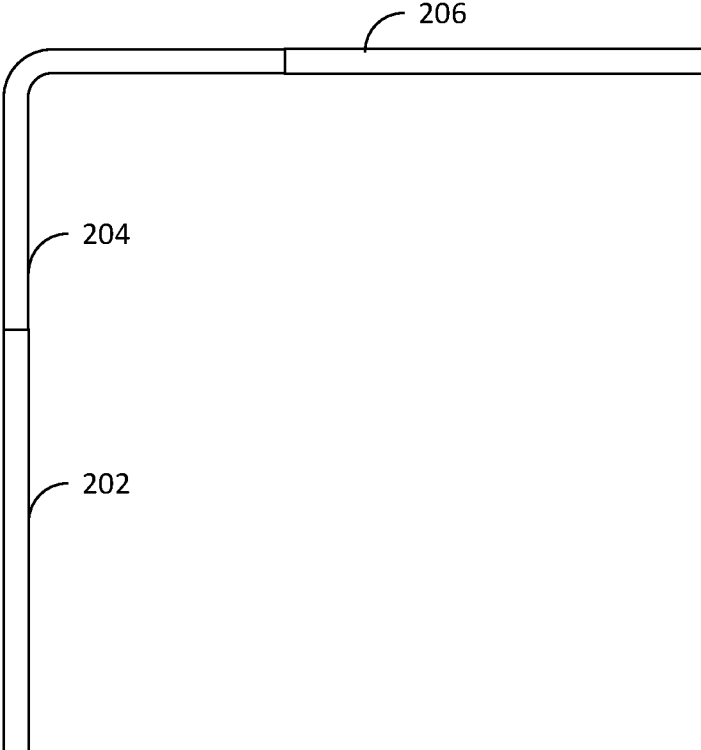
FIG. 2 shows an example network of interlinked prescribed paths.

FIG. 2 shows an example network of interlinked prescribed paths 200. The example network of interlinked prescribed paths 200 includes a first prescribed path 202, a second prescribed path 204, and a third prescribed path 206. The first prescribed path 202 and the third prescribed path 206 can be straight or substantially straight prescribed paths, e.g. straight in three dimensions in three-dimensional Euclidian space. Further, the second prescribed path 204 can be a curved prescribed path, e.g. curved in three dimensions in three-dimensional Euclidian space.

The first prescribed path 202, the second prescribed path 204, and the third prescribed path 206 are interlinked to form the network of interlinked prescribed paths 200. More specifically, the first prescribed path 202, the second prescribed path 204, and the third prescribed path 206 are physically connected, as part of being interlinked, to form the network of interlinked prescribed paths 200. In being physically connected, an applicable combination of the first prescribed path 202, the second prescribed path 204, and the third prescribed path 206 can overlap, at least in part, in space. More specifically, an applicable combination of the first prescribed path 202, the second prescribed path 204, and the third prescribed path 206 can overlap to effectively form a single prescribed path as part of the network of interlinked prescribed paths 200. For example, the first prescribed path 202 can overlap with the second prescribed path 204 to physically connect the first prescribed path 202 and the second prescribed path 204 and form, at least in part, the network of interlinked prescribed paths 200. Further in the example, the second prescribed path 204 can overlap with the third prescribed path 206 to physically connect the second prescribed path 204 and the third prescribed path 206 and form, at least in part, the network of interlinked prescribed paths 200.

A wireless power receiver, as will be discussed in greater detail later, can receive energy wirelessly from one or more wireless power transmitters as it moves along the network of interlinked prescribed paths 200. Specifically, a wireless power receiver can receive energy wirelessly at it moves along physical connections between one or a combination of the first prescribed path 202, the second prescribed path 204, and the third prescribed path 206 forming the network of interlinked prescribed paths 200.

Figure 3:
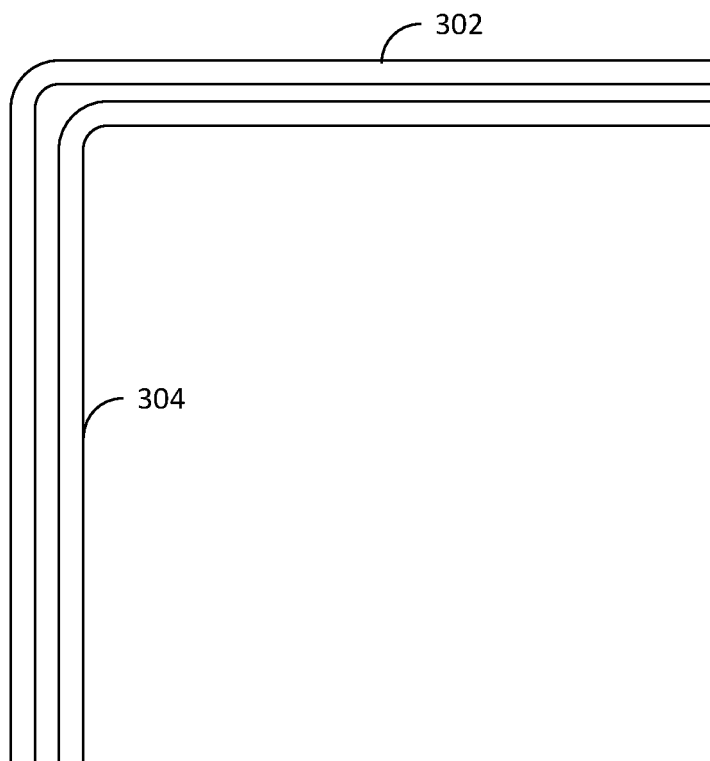
FIG. 3 shows another example network of interlinked prescribed paths.

FIG. 3 shows another example network of interlinked prescribed paths 300. The example network of interlinked prescribed paths 300 includes a first prescribed path 302 and a second prescribed path 304. Either or both the first prescribed path 302 and the second prescribed path 304 can be formed by a plurality of interlinked prescribed paths. Specifically, either or both the first prescribed path 302 and the second prescribed path 304 can be formed by a plurality of prescribed paths that are interlinked through physical connections. For example, the first prescribed path 302 can be formed by a plurality of prescribed paths that overlap, at least in part, to physically connect the plurality of prescribed paths to form the first prescribed path 302.

The first prescribed path 302 and the second prescribed path 304 are interlinked to form the network of interlinked prescribed paths 300. Specifically, the first prescribed path 302 and the second prescribed path 304 are physically separated, e.g. by a gap, and are grouped together to form the network of interlinked prescribed paths 300. Physically separated prescribed paths can be grouped together or otherwise interlinked to form a network of interlinked prescribed paths 300 based on physical locations of the prescribed paths within space. For example, a prescribed path adjacent to a first prescribed path can be grouped with or otherwise interlinked with the first prescribed path to form a network of interlinked prescribed paths. Further, physically separated prescribed paths can be grouped together to form a network of interlinked prescribed paths based on whether a wireless power receiver can move between the physically separated prescribed paths as it traverses the network of interlinked prescribed paths. For example, if a wireless power receiver can power itself as it moves between two physically separated prescribed paths, then the physically separated prescribed paths can be interlinked to form a network of interlinked prescribed paths.

A wireless power receiver, as will be discussed in greater detail later, can receive energy wirelessly from one or more wireless power transmitters as it moves along the network of interlinked prescribed paths 300. Specifically, a wireless power receiver can receive energy wirelessly at it moves along either of the physically separated first prescribed path 302 and second prescribed path 304 of the network of interlinked prescribed paths 300.

Further, a wireless power receiver can power itself as it moves between the physically separated first prescribed path 302 and the second prescribed path 304. Specifically, a wireless power receiver can include a power source, e.g. a battery, that is configured to power the wireless power receiver as the wireless power receiver moves from the first prescribed path 302 to the second prescribed path 304 across a gap that physically separates the first prescribed path 302 and the second prescribed path 304. For example, a wireless power receiver can receive wireless energy from one or more wireless power transmitters as it traverses the first prescribed path 302. Further in the example, the wireless power receiver can power itself, e.g. using a battery, as it moves across a gap from the first prescribed path 302 to the second prescribed path 304. Still further in the example, the wireless power receiver can then receive wireless energy from one or more wireless power transmitters once it moves into the second prescribed path 304 and begins traversing the second prescribed path 304.

Figure 4:
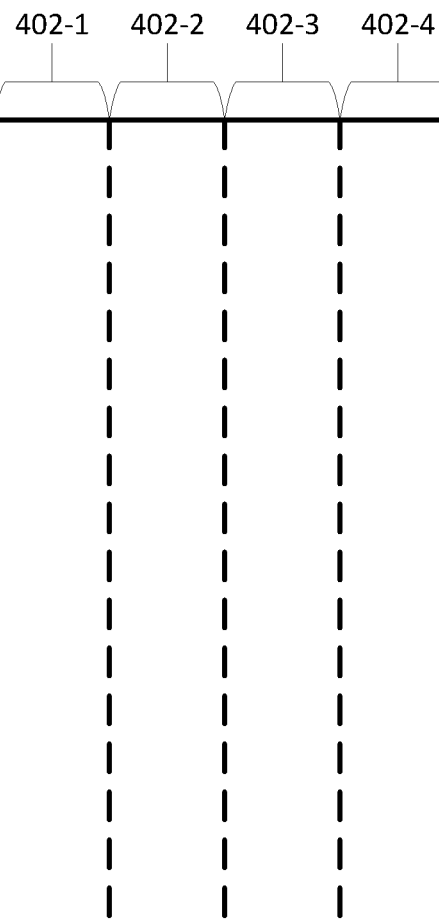
FIG. 4 shows an example prescribed path.

FIG. 4 shows an example prescribed path 400. The prescribed path 400 includes a plurality of designated lanes. The prescribed path 400 shown in FIG. 4 can be implemented as part of an applicable network of interlinked prescribed paths that a wireless power receiver can traverse, such as the network of interlinked prescribed paths shown in FIGS. 2 and 3. Specifically, the prescribed path 400 can be physically connected to another prescribed path to form, at least in part, a network of interlinked prescribed paths. Alternatively, the prescribed path 400 can be physically separate from another prescribed path, but grouped with the other prescribed path to form a network of interlinked prescribed paths.

The prescribed path 400 includes a first designated lane 402-1, a second designated lane 402-2, a third designated lane 402-3, and a fourth designated lane 402-4 (herein collectively referred to as "designated lanes 402"). The designated lanes 402 can be defined by a region of space with the prescribed path 400. For example, each of the designated lanes 402 can have a set width within the prescribed path 400. In another example, each of the designated lanes 402 can have a set length along the prescribed path 400.

The designated lanes 402 can support traversal of one or more wireless power receivers as the one or more wireless power receivers move along the prescribed path 400, e.g. in a network of interlinked prescribed paths. Specifically, a single wireless power receiver can move along or within a lane of the designated lanes 402 as the wireless power receiver traverses the prescribed path 400. More specifically, a lane of the designated lanes 402 can be separated for traversal by a single line, e.g. single file, of wireless power receivers as the wireless power receivers traverse a network of interlinked prescribed paths using the lane. Further, a wireless power receiver can switch between the lanes 402 as the wireless power receiver traverses the prescribed path 400. For example, a wireless power receiver can move from the first lane 402-1 to the second lane 402-2 as the wireless power receiver traverses the prescribed path 400, e.g. as part of traversing a network of interlinked prescribed paths.

In supporting traversal of wireless power receivers as the wireless power receivers traverse the prescribed path 400, the designated lanes 402 can support concurrent traversal of the wireless power receivers. Specifically, a first wireless power receiver can traverse the first designated lane 402-1 as a second wireless power receiver traverse the second designated lane 402-2. More specifically, the first wireless power receiver can concurrently traverse the first designated lane 402-1 as the second wireless power receiver traverses the second designated lane 402-2 and energy is concurrently transferred to the receivers wirelessly as the receivers traverse the first designated lane 402-1 and the second designated lane 402-2.

While the prescribed path 400 is shown to have four designated lanes, a prescribed path, as described herein, can include more or fewer lanes. Further, while the lanes 402 are shown to be adjacent to each other, in various embodiments, the lanes 402 can intersect each other and/or extend away from each other. Further, the lanes 402 can extend across a plurality of different prescribed paths. For example, the first lane 402-1 can extend into another prescribed path that is physically connected to the prescribed path 400. In another example, the second lane 402-2 can extend into another prescribed path that is physically separated from the prescribed path 400.

Referring back to the example system 100 shown in FIG. 1, the wireless power transmitter 102 can wirelessly transmit energy to the wireless power receiver 104 based on a position, e.g. a tracked position, of the wireless power receiver 104 in the network of interlinked prescribed paths 106. For example, a beam of energy can be broadcast towards a current position of the wireless power receiver 104 in the network of interlinked prescribed paths in order to wirelessly transfer energy to the wireless power receiver 104. Similarly, the wireless power receiver 104 can receive wirelessly transferred energy based on a position, e.g. a tracked position, of the wireless power receiver 104 in the network of interlinked prescribed paths 106. For example, the wireless power receiver 104 can wirelessly receive energy from a beam of energy broadcast towards the wireless power receiver 104 based on a position of the wireless power receiver 104 in the network of interlinked prescribed paths 106. A position of the wireless power receiver 104 in the network of interlinked prescribed paths 106 can include one or a combination of a specific prescribed path where the wireless power receiver 104 is located, a region within the prescribed path where the wireless power receiver 104 is located, and a specific lane within the prescribed path where the wireless power receiver 104 is located.

A position of the wireless power receiver 104 within the network of interlinked prescribed paths 106 can change as the wireless power receiver 104 traverses the network of interlinked prescribed paths 106. Accordingly, the changing position of the wireless power receiver 104 within the network of interlinked prescribed paths 106 can be actively tracked as wireless power receiver 104 traverses the network of interlinked prescribed paths 106. As follows, the wireless power transmitter 102 can wirelessly transmit energy to the wireless power receiver 104 based on an actively tracked position, e.g. a changing position, of the wireless power receiver 104 in the network of interlinked prescribed paths 106. For example, a beam of energy can be broadcast towards a changing position of the wireless power receiver 104 in the network of interlinked prescribed paths in order to wirelessly transfer energy to the wireless power receiver 104. Similarly, the wireless power receiver 104 can receive wirelessly transferred energy based on an actively tracked position, e.g. a changing position, of the wireless power receiver 104 in the network of interlinked prescribed paths 106. For example, the wireless power receiver 104 can wirelessly receive energy from a beam of energy broadcast towards a changing position of the wireless power receiver 104 in the network of interlinked prescribed paths 106.

Further, the wireless power transmitter 102 can transmit beams of energy to the wireless power receiver 104 traversing the network of interlinked prescribed paths 106 based on the fact that the prescribed paths are pre-defined paths. Specifically, the wireless power transmitter 102 can be configured and/or positioned to transmit beams of energy to specific portions of the network of interlinked prescribed paths 106 based on a pre-defined location and length of a prescribed path in the network of interlinked prescribed paths 106. For example, with reference to the network of interlinked prescribed paths 200 shown in FIG. 2, the wireless power transmitter can be positioned in proximity to the first prescribed path 202 in order to transmit beams of energy to wireless power receivers traversing the first prescribed path 202 as they traverse the network of interlinked prescribed paths 200.

In transmitting wireless energy to a wireless power receiver based on a position of the receiver in a network of interlinked prescribed paths, one or a plurality of wireless power transmitters can transmit wireless energy to the receiver based on a lane traversed by the receiver. Specifically, one or more wireless power transmitters can wireless transmit energy to a wireless power receiver as the receiver switches between different lanes of a network of interlinked prescribed paths. For example, as will be discussed in greater detail later, a wireless power transmitter can switch a beam of energy across different lanes of a network of interlinked prescribed paths as a wireless power receiver changes between the different lanes. In another example, a wireless power transmitter can broadcast a beam of energy that extends across different designated lanes to wirelessly transfer energy to a wireless power receiver as it switches between the different designated lanes. In yet another example, each designated lane can have a corresponding wireless power transmitter configured to broadcast a beam of energy along each designated lane. Subsequently, the different wireless power transmitters can provide wireless energy to a wireless power receiver as it switches between corresponding designated lanes of the wireless power transmitters.

FIGS. 5A-F illustrate different beam patterns of one or more beams of energy broadcast to wirelessly transfer energy to one or more wireless power receivers traversing a network of interlinked prescribed paths 500. The network of interlinked prescribed paths 500 discussed with reference to the beam patterns shown in FIGS. 5A-F includes a first prescribed path 502 and a second prescribed path 504.

Figure 5A:
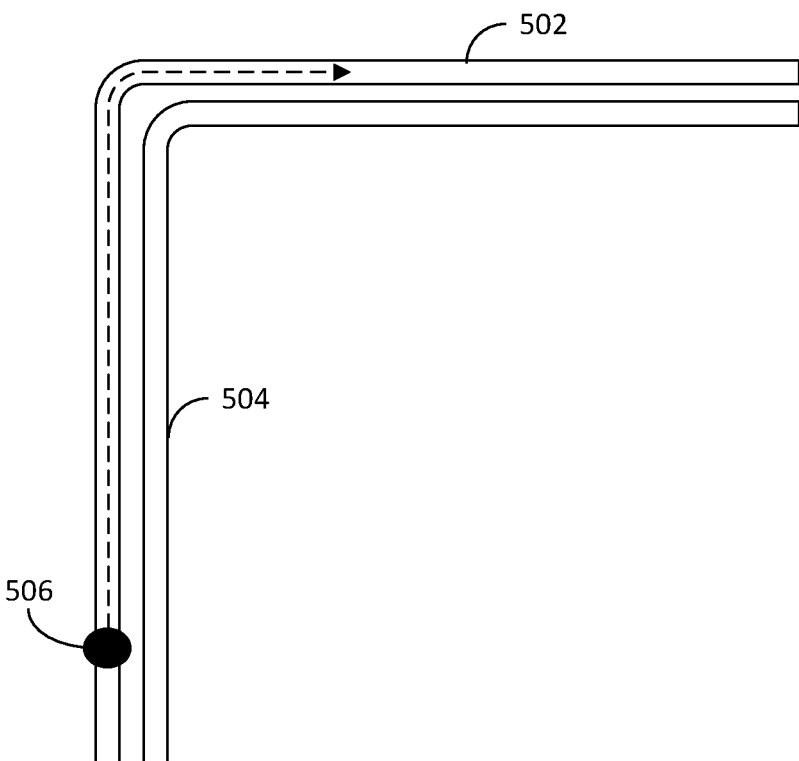
FIGS. 5A-F illustrate different beam patterns of one or more beams of energy broadcast to wirelessly transfer energy to one or more wireless power receivers traversing a network of interlinked prescribed paths.

The example beam pattern shown in FIG. 5A includes a main lobe 506 of a beam of energy for wirelessly transferring energy to a wireless power receiver. While the main lobe 506 is shown to extend beyond the first prescribed path 502, in various embodiments, the main lobe 506 can be wholly contained within the first prescribed path 502. Alternatively, the main lobe 506 can extend into the second prescribed path 504 to cover at least a portion of both the first prescribed path 502 and the second prescribed path 504. Specifically, the main lobe 506 can have a width greater than a width of the first prescribed path 502.

The main lobe 506 can be swept along the first prescribed path 502 in order to wirelessly transfer energy to a wireless power receiver traversing the first prescribed path 502. Specifically, a wireless power transmitter can control a beam of energy to sweep the corresponding main lobe 506 of the beam of energy along the first prescribed path 502. The main lobe 506 can be swept along the first prescribed path 502 according to a set manner. For example, the main lobe 506 can be swept along the first prescribed path 502 at a constant pre-defined speed. Further, while the main lobe 506 is shown as moving along the first prescribed path 502 in a single direction, in various embodiments, the main lobe 506 can move in multiple directions within the first prescribed path 502. For example, the main lobe 506 can be swept back and forth across a width of the first prescribed path 502.

A position of a wireless power receiver traversing the first prescribed path 502 can correspond to a position of the main lobe 506 in the first prescribed path 502 as the main lobe 506 is swept along the first prescribed path 502. Specifically, the main lobe 506 can be controlled to follow a position of a moving wireless power receiver and subsequently sweep along the first prescribed path 502 as the receiver traverses the first prescribed path 502. Alternatively, a wireless power receiver can be configured to follow the main lobe 506 in the first prescribed path 502 as the main lobe 506 is swept along the first prescribed path 502. More specifically, the main lobe 506 can be swept along the first prescribed path 502 at a set speed and a wireless power receiver can follow the main lobe 506 at the set speed.

Figure 5B:
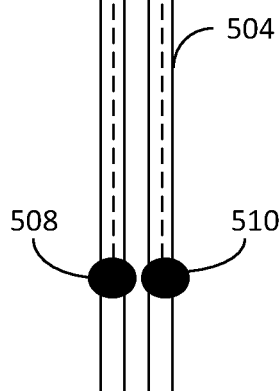

The example beam pattern shown in FIG. 5B includes a first main lobe 508 and a second main lobe 510 of one or more beams of energy for wirelessly transferring energy to one or more wireless power receivers. Both the first main lobe 508 and the second main lobe 510, or an applicable plurality of main lobes in a beam pattern described herein, can be created by a single beam of energy transmitted by a single wireless power receiver. Alternatively, both the first main lobe 508 and the second main lobe 510, or an applicable plurality of main lobes in a beam pattern described herein, can be created by multiple beams of energy transmitted by multiple wireless power receivers.

While the main lobes 508 and 510 are shown to extend beyond corresponding prescribed path 502 and 504, in various embodiments, the main lobes 508 and 510 can each be wholly contained within the corresponding paths 502 and 504. This is not just limited to the main lobes described with respect to FIGS. 5A and 5B, as any of the main lobes described herein can be wholly contained within a corresponding prescribed path of the main lobe. Alternatively, the main lobes 508 and 510 can extend into the adjacent corresponding prescribed paths 502 and 504 to cover at least a portion of both the first prescribed path 502 and the second prescribed path 504. Specifically, the main lobes 508 and 510 can have widths greater than the widths of the corresponding paths 502 and 504. This is not just limited to the main lobes described with respect to FIGS. 5A and 5B, as any of the main lobes described herein can extend outside of a corresponding prescribed path of the main lobe.

The main lobes 508 and 510 can be swept along the first prescribed path 502 and the second prescribed path 504 in order to wirelessly transfer energy to one or more wireless power receivers traversing either or both the first prescribed path 502 and the second prescribed path 504. Specifically, one or more wireless power transmitters can control one or more beams of energy to sweep the corresponding main lobes 508 and 510 along the first prescribed path 502 and the second prescribed path 504. Either or both the first main lobe 508 and the second main lobe 510 can be swept along the corresponding first prescribed path 502 and the second prescribed path 504 according to a set manner. For example, the first main lobe 508 can be swept along the first prescribed path 502 at a constant pre-defined speed.

While the first main lobe 508 and the second main lobe 510 are shown as moving along the first prescribed path 502 and the second prescribed path 504 in a single direction, in various embodiments the first and second main lobes 508 and 510 can move in multiple directions within the first prescribed path 502 and the second prescribed path 504. For example, the second main lobe 510 can be swept back and forth across a width of the second prescribed path 504. Additionally, the first main lobe 508 and the second main lobe 510 can move along the first prescribed path 502 and the second prescribed path 504 at different speeds and/or in different directions. For example, the first main lobe 508 can be swept along the first prescribed path 502 at a constant pre-defined speed, while the second main lobe 510 is swept along the second prescribed path 504 at a variable speed, e.g. according to a variable speed of a wireless power receiver traversing the second prescribed path 504.

A position of one or more wireless power receivers traversing the first prescribed path 502 and the second prescribed path 504 can correspond to positions of the first main lobe 508 and the second main lobe 510 in the first prescribed path 502 and the second prescribed path 504. Specifically, the first main lobe 508 can be controlled to follow a position of a moving wireless power receiver and subsequently sweep along the first prescribed path 502 as the receiver traverses the first prescribed path 502. Alternatively, a wireless power receiver can be configured to follow the second main lobe 510 in the second prescribed path 504 as the second main lobe 510 is swept along the second prescribed path 504. More specifically, the second main lobe 510 can be swept along the second prescribed path 504 at a set speed and a wireless power receiver can follow the second main lobe 510 at the set speed.

Figure 5C:
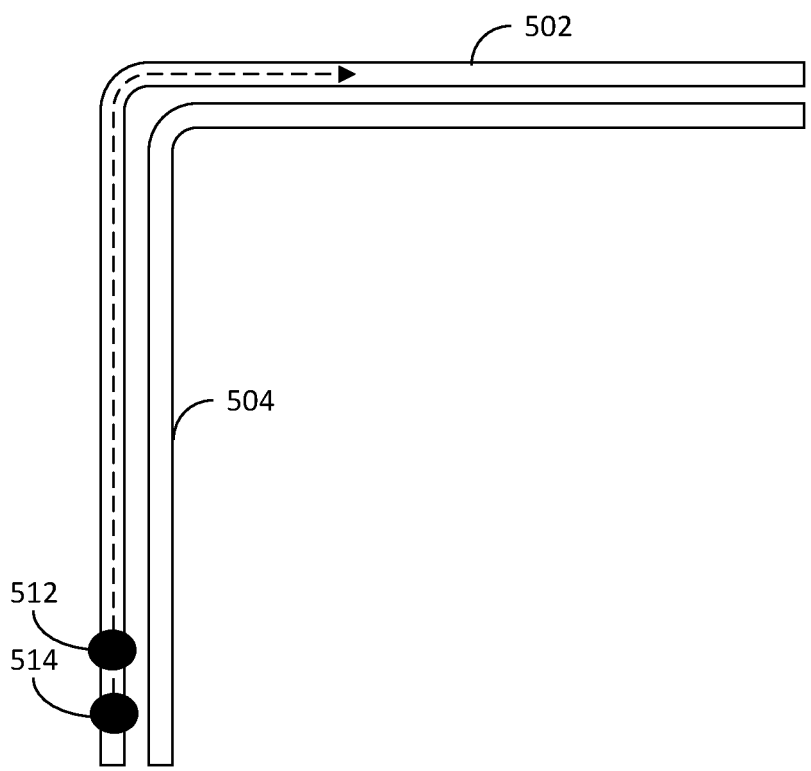

The example beam pattern shown in FIG. 5C includes a first main lobe 512 and a second main lobe 514 of one or more beams of energy for wirelessly transferring energy to one or more wireless power receivers. Specifically, the main lobes 512 and 514 can be swept along the first prescribed path 502 in order to wirelessly transfer energy to one or more wireless power receivers traversing the first prescribed path 502. More specifically, one or more wireless power transmitters can control one or more beams of energy to sweep the corresponding main lobes 512 and 514 along the first prescribed path 502. Either or both the first main lobe 512 and the second main lobe 514 can be swept along the first prescribed path 502 according to a set manner. For example, the second main lobe 514 can be swept along the first prescribed path 502 at a constant pre-defined speed.

While the first main lobe 512 and the second main lobe 514 are shown as moving along the first prescribed path 502 in a single direction, in various embodiments, the first and second main lobes 512 and 514 can move in multiple directions within the first prescribed path 502. For example, the first main lobe 512 can be swept back and forth across a width of the first prescribed path 502 as the first main lobe 512 is swept across the length of the first prescribed path 502. Additionally, the first main lobe 512 and the second main lobe 514 can move along the first prescribed path 502 at different speeds and/or in different directions. For example, the first main lobe 512 can be swept along the first prescribed path 502 at a constant pre-defined speed, while the second main lobe 514 is swept along the first prescribed path 502 at a variable speed.

A position of one or more wireless power receivers traversing the first prescribed path 502 can correspond to positions of the first main lobe 512 and the second main lobe 514 in the first prescribed path 502. Specifically, the first main lobe 512 can be controlled to follow a position of a moving wireless power receiver and subsequently sweep along the first prescribed path 502 as the receiver traverses the first prescribed path 502. Alternatively, a wireless power receiver can be configured to follow the second main lobe 514 in the first prescribed path 502 as the second main lobe 514 is swept along the first prescribed path 502. More specifically, the second main lobe 514 can be swept along the first prescribed path 502 at a set speed and a wireless power receiver can follow the second main lobe 514 at the set speed.

Figure 5D:
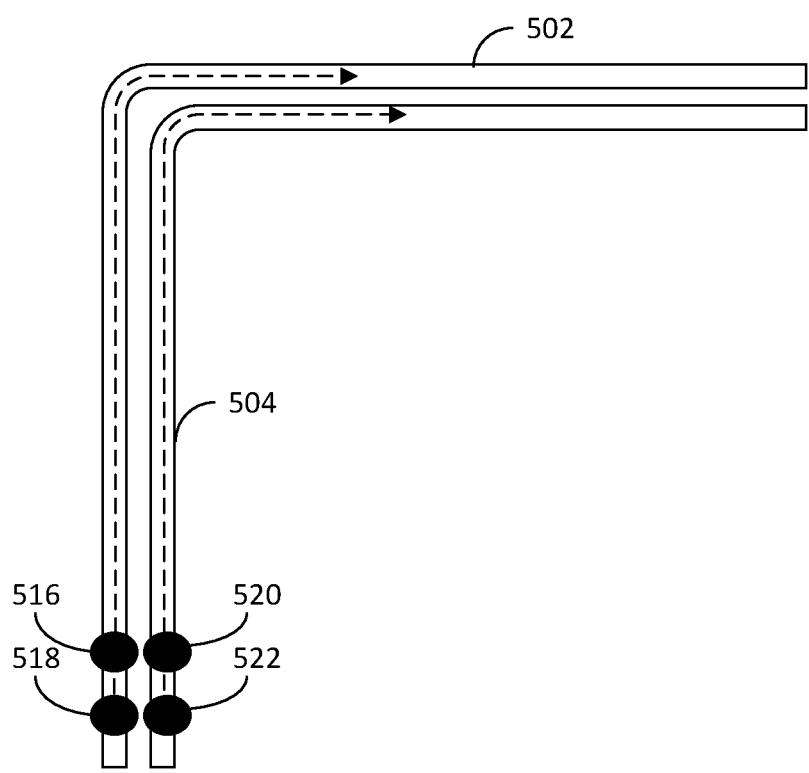

The example beam pattern shown in FIG. 5d includes a first main lobe 516 and a second main lobe 518 in the first prescribed path 502 of one or more beams of energy for wirelessly transferring energy to one or more wireless power receivers. Further, the example beam pattern includes a third main lobe 520 and a fourth main lobe 522 in the second prescribed path 504 of one or more beams of energy for wirelessly transferring energy to one or more wireless power receivers. Specifically, the main lobes 516 and 518 can be swept along the first prescribed path 502 in order to wirelessly transfer energy to one or more wireless power receivers traversing the first prescribed path 502. Further, the main lobes 520 and 522 can be swept along the second prescribed path 504 in order to wirelessly transfer energy to one or more wireless power receivers traversing the second prescribed path 504. Specifically, one or more wireless power transmitters can control one or more beams of energy to sweep the corresponding main lobes 516, 518, 520, and 522 along the first prescribed path 502 and the second prescribed path 504. Any of the main lobes 516, 518, 520, and 522 can be swept along the first prescribed path 502 and the second prescribed path 504 according to a set manner. For example, the third main lobe 520 can be swept along the second prescribed path 504 at a variable pre-defined speed.

While the main lobes 516, 518, 520, and 522 are shown as moving along the first prescribed path 502 and the second prescribed path 504 in a single direction, in various embodiments, the main lobes 516, 518, 520, and 522 can move in multiple directions within the first prescribed path 502 and the second prescribed path 504. For example, the third main lobe 520 can be swept back and forth across a width of the second prescribed path 504 as the third main lobe 520 is swept across the length of the second prescribed path 504. Additionally, the main lobes 516, 518, 520, and 522 can move along the first prescribed path 502 and the second prescribed path 504 at different speeds and/or in different directions. For example, the third main lobe 520 can be swept along the second prescribed path 504 at a constant pre-defined speed, while the fourth main lobe 522 is swept along the second prescribed path 504 at a variable speed.

A position of one or more wireless power receivers traversing either or both the first prescribed path 502 and the second prescribed path 504 can correspond to positions of the main lobes 516, 518, 520 and 522 in the first prescribed path 502 and the second prescribed path 504. Specifically, the third main lobe 520 can be controlled to follow a position of a moving wireless power receiver and subsequently sweep along the second prescribed path 504 as the receiver traverses the second prescribed path 504. Alternatively, a wireless power receiver can be configured to follow the fourth main lobe 522 in the second prescribed path 504 as the fourth main lobe 522 is swept along the second prescribed path 504. More specifically, the fourth main lobe 522 can be swept along the second prescribed path 504 at a set speed and a wireless power receiver can follow the fourth main lobe 522 at the set speed.

Figure 5E:
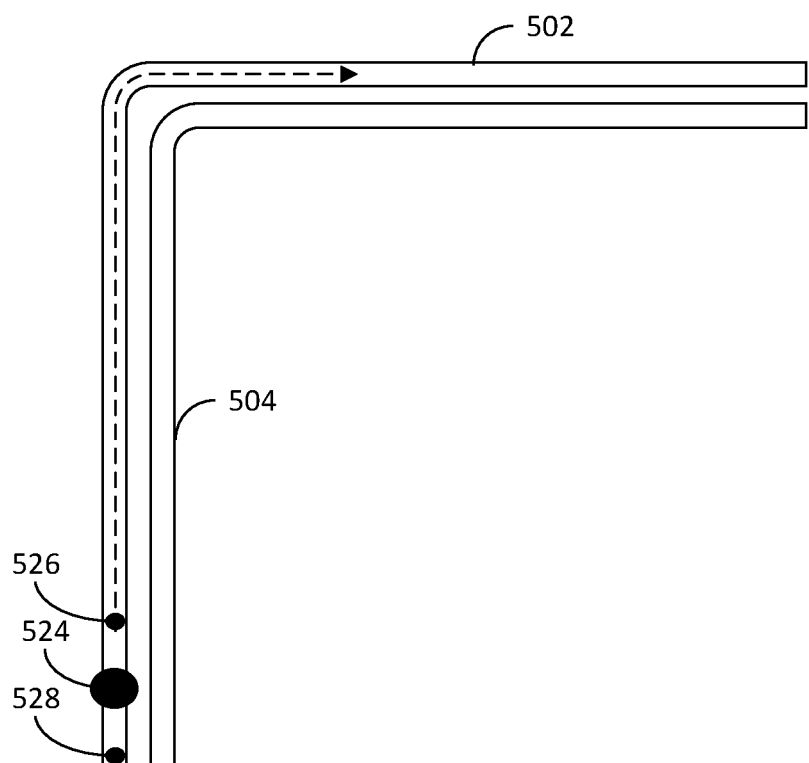

The example beam pattern shown in FIG. 5E includes a main lobe 524, a first grating lobe 526, and a second grating lobe 528 of one or more beams of energy for wirelessly transferring energy to one or more wireless power receivers. Specifically, the main lobe 524, the first grating lobe 526, and the second grating lobe 528 can be swept along the first prescribed path 502 in order to wirelessly transfer energy to one or more wireless power receivers traversing the first prescribed path 502. More specifically, one or more wireless power transmitters can control one or more beams of energy to sweep the corresponding main lobe 524, the first grating lobe 526, and the second grating lobe 528 along the first prescribed path 502. One or a combination of the main lobe 524, the first grating lobe 526, and the second grating lobe 528 can be swept along the first prescribed path 502 according to a set manner. For example, both the first grating lobe 526 and the main lobe 524 can be swept along the first prescribed path 502 at a constant pre-defined speed.

While the grating lobes 526 and 528 are shown to be wholly contained within the first prescribed path 502, in various embodiments, the grating lobes 526 and 528 can each be of a width and/or positioned to extend out of a prescribed path. This is not just limited to the grating lobes described with respect to FIG. 5E, as any of the grating lobes described herein can extend out of a prescribed path.

Further, while the main lobe 524, the first grating lobe 526, and the second grating lobe 528 are shown as moving along the first prescribed path 502 in a single direction, in various embodiments, the main lobe 524, the first grating lobe 526, and the second grating lobe 528 can move in multiple directions within the first prescribed path 502. For example, the main lobe 524, the first grating lobe 526, and the second grating lobe 528 can be swept back and forth across a width of the first prescribed path 502 as they are swept across the length of the first prescribed path 502. Additionally, the main lobe 524, the first grating lobe 526, and the second grating lobe 528 can move along the first prescribed path 502 at different speeds and/or in different directions. For example, the main lobe 524 can be swept along the first prescribed path 502 at a constant pre-defined speed, while the grating lobes 526 and 528 are swept along the first prescribed path 502 at a variable speed.

A position of one or more wireless power receivers traversing the first prescribed path 502 can correspond to positions of the main lobe 524, the first grating lobe 526, and the second grating lobe 528 in the first prescribed path 502. Specifically, the main lobe 524 can be controlled to follow a position of a moving wireless power receiver and subsequently sweep along the first prescribed path 502 as the receiver traverses the first prescribed path 502. Alternatively, a wireless power receiver can be configured to follow the second grating lobe 528 in the first prescribed path 502 as the second grating lobe 528 is swept along the first prescribed path 502. More specifically, the second grating lobe 528 can be swept along the first prescribed path 502 at a set speed and a wireless power receiver can follow the second grating lobe 528 at the set speed.

Figure 5F:
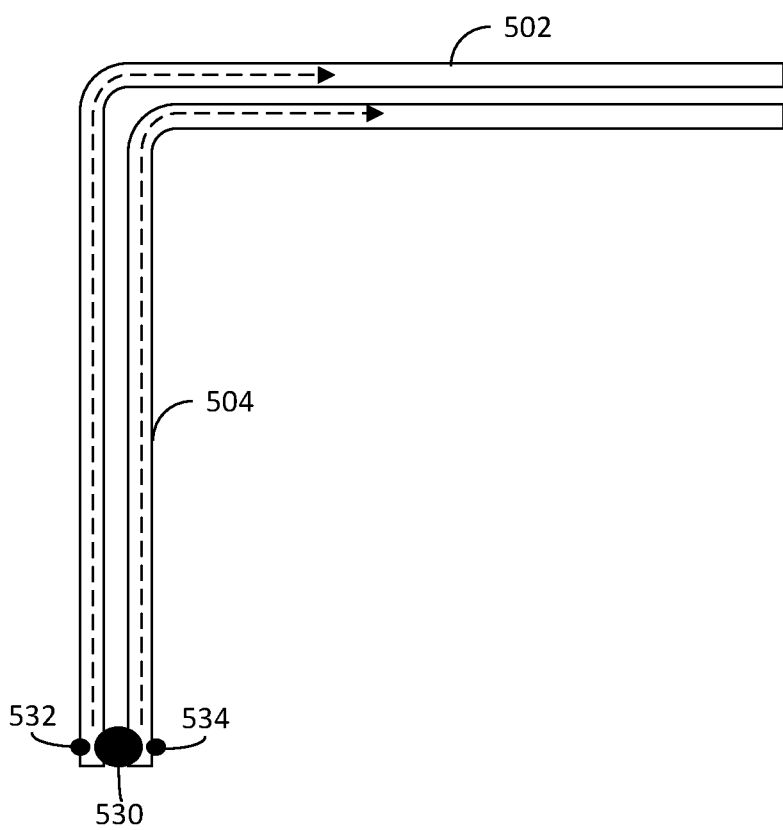

The example beam pattern shown in FIG. 5F includes a main lobe 530, a first grating lobe 532, and a second grating lobe 534 of one or more beams of energy for wirelessly transferring energy to one or more wireless power receivers. Specifically, the main lobe 530, the first grating lobe 532, and the second grating lobe 534 can be swept along both the first prescribed path 502 and the second prescribed path 504 in order to wirelessly transfer energy to one or more wireless power receivers traversing the first prescribed path 502 and the second prescribed path 504. More specifically, one or more wireless power transmitters can control one or more beams of energy to sweep the corresponding main lobe 530, the first grating lobe 532, and the second grating lobe 534 along either or both the first prescribed path 502 and the second prescribed path 504. One or a combination of the main lobe 530, the first grating lobe 532, and the second grating lobe 534 can be swept along either or both the first prescribed path 502 and the second prescribed path 504 according to a set manner. For example, the main lobe 530 can be swept along both the first prescribed path 502 and the second prescribed path 504 at a constant pre-defined speed.

While the main lobe 530, the first grating lobe 532, and the second grating lobe 534 are shown as moving along both the first prescribed path 502 and the second prescribed path 504 in a single direction, in various embodiments, the main lobe 530, the first grating lobe 532, and the second grating lobe 534 can move in multiple directions with respect to the first prescribed path 502 and/or the second prescribed path 502. For example, the first grating lobe 532, and the second grating lobe 534 can be swept back and forth across widths of the first prescribed path 502 and the second prescribed paths 504 as they are swept across the lengths of the first prescribed path 502 and the second prescribed path 504. Additionally, the main lobe 530, the first grating lobe 532, and the second grating lobe 534 can move along either or both the first prescribed path 502 and the second prescribed path 504 at different speeds and/or in different directions.

A position of one or more wireless power receivers traversing the first prescribed path 502 and the second prescribed path 504 can correspond to positions of one or a combination of the main lobe 530, the first grating lobe 532, and the second grating lobe 534 in the first prescribed path 502 and the second prescribed path 504. Specifically, the main lobe 530 can be controlled to follow a position of a moving wireless power receiver and subsequently sweep along the first prescribed path 502 as the receiver traverses the first prescribed path 502. Alternatively, a wireless power receiver can be configured to follow the second grating lobe 534 in the second prescribed path 504 as the second grating lobe 534 is swept along the second prescribed path 504. More specifically, the second grating lobe 534 can be swept along the second prescribed path 504 at a set speed and a wireless power receiver can follow the second grating lobe 534 at the set speed.

While the beam lobes in the example beam patterns of FIGS. 5A-5F are shown to move within the prescribed paths 502 or 504, in various embodiments, the beam lobes can be broadcast to switch, e.g. sweep or selectively switch, between the prescribed paths 502 and 504. For example, a wireless power transmitter can be configured to switch broadcasting of the main lobe 506 between the first prescribed path 502 and the second prescribed path 504. Further in the example, one or more wireless power receivers can be configured to receive wireless energy from the main lobe 506 as the one or more wireless power receivers traverse the first prescribed 502 and/or the second prescribed path 504 and as the main lobe 506 is broadcast, e.g. swept, between the first and second prescribed paths 502 and 504. In another example, a wireless power transmitter can be configured to switch broadcasting of the grating lobe 526 between the first prescribed path 502 and the second prescribed path 504. Further in the example, one or more wireless power receivers can be configured to receive wireless energy from the grating lobe 526 as the one or more wireless power receivers traverse the first prescribed 502 and/or the second prescribed path 504 and as the grating lobe 526 is broadcast, e.g. swept, between the first and second prescribed paths 502 and 504.

Figure 6A:
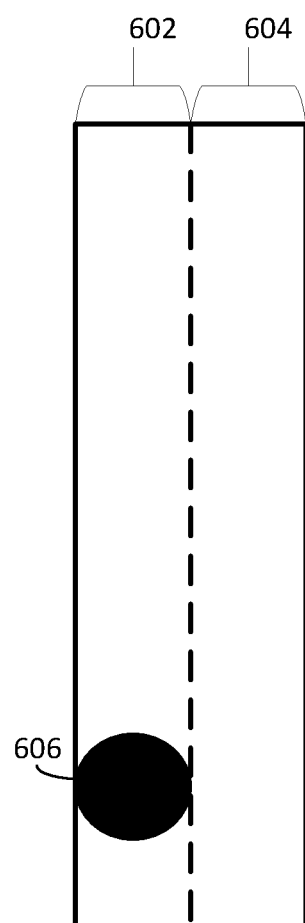
FIGS. 6A-C illustrate different beam patterns of one or more beams of energy broadcast to wirelessly transfer energy to one or more wireless power receivers traversing a prescribed path based on designated lanes.
Figure 6B:
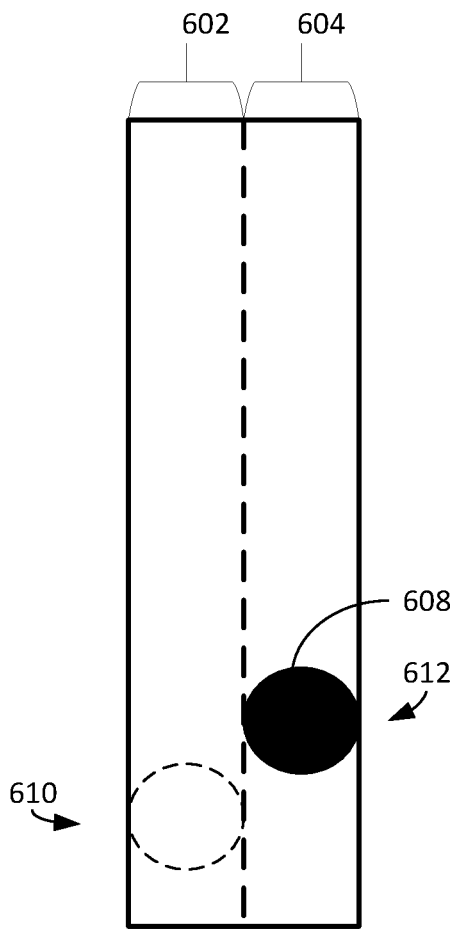
Figure 6C:
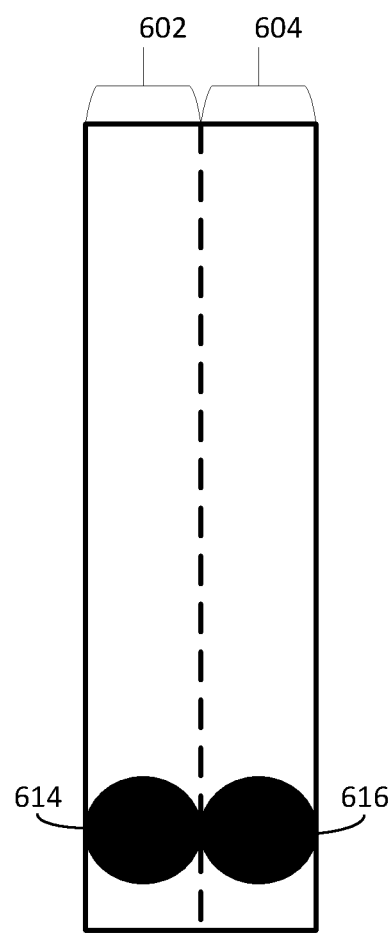

FIGS. 6A-C illustrate different beam patterns of one or more beams of energy broadcast to wirelessly transfer energy to one or more wireless power receivers traversing a prescribed path 600 based on designated lanes. Specifically, the prescribed path 600 includes a first designated lane 602 and a second designated lane 604. The designated lanes described herein can have a corresponding traffic flow direction along which wireless power receiver traverse when traversing the designated lanes. For example, both the first designated lane 602 and the second designated lane 604 can have the same traffic flow direction such that wireless power receivers move along the same direction when traversing the first designated lane 602 and the second designated lane 604. Alternatively, the first designated lane 602 and the second designated lane 604 can have opposite traffic flow directions. As a result, wireless power receivers can move in opposite directions of each other when traversing the corresponding first designated lane 602 and the second designated lane 604.

In having a traffic flow direction, one or more wireless power transmitters associated with a designated lane can be configured to broadcast a beam of energy along the designated lane in the traffic flow direction of the designated lane. For example, a wireless power transmitter can be configured to broadcast a beam of energy in a specific designated lane, and the wireless power transmitter can be configured to broadcast the beam of energy along the traffic flow direction of the specific designated lane. Accordingly, a wireless power receiver can be configured to receive wireless energy broadcast along a traffic flow direction of a designated lane traversed by the wireless power receiver. Specifically, a wireless power receiver traversing a specific designated lane can be configured to receive a beam of energy broadcast by a transmitter according to the traffic flow direction of the specific designated lane.

The beams of energy discussed with respect to the beam patterns shown in FIGS. 6A-C can include one main lobe. For example, a beam of energy broadcast in the first designated lane 602 can include a single main lobe. Alternatively, the beams of energy discussed with respect to the beam patterns shown in FIGS. 6A-C can include one or a combination of one main lobe, a plurality of main lobes, one grating lobe, and a plurality of grating lobes. For example, a beam of energy broadcast in the second designated lane 604 can include a main lobe and a plurality of grating lobes. In another example, a beam of energy broadcast in the second designated lane 604 can include a plurality of main lobes.

While each beam discussed in conjunction with each beam pattern in FIGS. 6A-C are represented and discussed as a single beam of energy, in various embodiments, each beam can actually represent a plurality of beams. Specifically, each beam discussed in conjunction with each beam pattern in FIGS. 6A-C can include a plurality of beams broadcast by one or more wireless power transmitters.

The example beam pattern shown in FIG. 6A includes a beam 606 that is broadcast in the first designated lane 602. The beam 606 can be transmitted by a wireless power transmitter to wirelessly transmit energy to one or more wireless power receivers. Specifically, the beam 606 can be transmitted by a wireless power transmitter to wirelessly transmit energy to one or more wireless power receivers as the wireless power receivers traverse the first designated lane 602. More specifically the beam 606 can be transmitted to a position corresponding to a position of the one or more wireless power receivers in the first designated lane 602 as the wireless power receivers traverse the first designated lane 602.

One or more wireless power transmitters can be controlled to sweep the beam 606 along the first designated lane 602. Specifically, one or more wireless power transmitters can be controlled to sweep the beam 606 along the first designated lane 602 as a wireless power receiver moves with the beam 606 while traversing the first designated lane 602. Alternatively, the one or more wireless power transmitters can be controlled to sweep the beam 606 along the first designated lane 602 based on a position of a wireless power receiver as it traverses the first designated lane 602. For example, the one or more wireless power transmitters can be configured to broadcast the beam 606 to follow the wireless power receiver as the wireless power receiver traverses the first designated lane 602. Further, a wireless power receiver traversing the first designated lane 602 can be configured to receive the beam 606 as it is swept across the first designated lane 602, e.g. by following the beam 606 as it is swept across the first designated lane 602.

While the beam 606 is shown to be contained entirely within the first designated lane 602, in various embodiments, the beam 606 can extend to cover, at least part of, the second designated lane 604. For example, the beam 606 can include one or more main lobes and/or grating lobes that extend into the second designated lane 604.

Further, as the beam 606 can represent more than one beam, one or more transmitters can be configured to broadcast a plurality of beams of energy, represented as the beam 606 in FIG. 6A, in the first designated lane 602. The plurality of beams of energy can each include multiple lobes that are broadcast in the first designated lane 602. Accordingly, one or more wireless power receivers can receive multiple beams of energy and/or multiple lobes as the wireless power receivers traverse the first designated lane 602. In particular, multiple wireless power receivers can simultaneously receive energy from the multiple beams of energy and/or the multiple lobes as the wireless power receivers traverse the first designated lane 602 simultaneously.

The example beam pattern shown in FIG. 6B includes a beam 608 that is broadcast in the first designated lane 602 and the second designated lane 604. Specifically, the beam 608 can be broadcast to switch between the first designated lane 602, e.g. at position 610, and the second designated lane 604, e.g. at position 612. For example, the beam 608 can be broadcast into the first designated lane 602, e.g. at position 610, switched off and then switched on as it is broadcast into the second designated lane 604, e.g. at position 612. Alternatively, the beam 608 can be swept between the first designated lane 602 and the second designated lane 604, e.g. between positions 610 and 612, without actually being turned off.

The beam 608 can be transmitted by one or more wireless power transmitters to wirelessly transmit energy to one or more wireless power receivers. Specifically, the beam 608 can be transmitted by one or more wireless power transmitters to wirelessly transmit energy to one or more wireless power receivers as the one or more wireless power receivers traverse the first designated lane 602 and/or the second designated lane 604. More specifically the beam 608 can be transmitted to positions corresponding to one or more positions of one or more wireless power receivers in the first designated lane 602 and/or the second designated lane 604 as the one or more wireless power receivers traverse the first designated lane 602 and/or the second designated lane 604.

One or more wireless power transmitters can be controlled to switch the beam 608 along the first designated lane 602 and the second designated lane 604. Specifically, one or more wireless power transmitters can be controlled to switch the beam 608 along the first designated lane 602 and the second designated lane 604 as one or more wireless power receivers move with the beam 608 while traversing either or both the first designated lane 602 and the second designated lane 604. Alternatively, the one or more wireless power transmitters can be controlled to switch the beam 608 along the first designated lane 602 and the second designated lane 604 based on a position of one or more wireless power receivers as they traverses either or both the first designated lane 602 and the second designated lane 604. For example, the one or more wireless power transmitters can be configured to broadcast the beam 608 to follow the wireless power receiver as the wireless power receiver traverses either or both the first designated lane 602 and the second designated lane 604. As follows, a wireless power receiver traversing either or both the first designated lane 602 and the second designated lane 604 can be configured to receive the beam 608 as it is switched between the first designated lane 602 and the second designated lane 604.

In various embodiments, one or more wireless power transmitters can switch the beam 612 between the first designated lane 602 and the second designated lane 604 in response to a lane change request. For example, a transmitter can sweep the beam 612 from the first designated lane 602 to the second designated lane 604 in order to switch the beam 612 in response to a lane change request. Alternatively, a transmitter can turn off the beam 612 as it is broadcast in the first designated lane 602, and reconfigure the beam 612 to be broadcast into the second designated lane 604 in response to a lane change request. A lane change request, as used herein, can indicate that one or more wireless power receivers are switching lanes, e.g. from the first designated lane 602 to the second designated lane. A lane change request can be received at one or more wireless power transmitters from a wireless power receiver. Further and as will be discussed in greater detail later, a lane change request can be received from a central control hub for a network of interlinked prescribed paths.

While the beam 608 is shown to be contained entirely within either the first designated lane 602 or the second designated lane 604, in various embodiments, the beam 608 can extend to cover, at least part of, the second designated lane 604 or the first designated lane 602. For example, the beam 608 can include one or more main lobes and/or grating lobes that extend into the second designated lane 604 while the beam is at position 610.

Further, as the beam 608 can represent more than one beam, one or more transmitters can be configured to broadcast a plurality of beams of energy, represented as the beam 608 in FIG. 6B, in the first designated lane 602 or the second designated lane 604. The plurality of beams of energy can each include multiple lobes that are broadcast in the first designated lane 602 or the second designated lane 604. Accordingly, one or more wireless power receivers can receive multiple beams of energy and/or multiple lobes as the wireless power receivers traverse the first designated lane 602 and/or the second designated lane 604. In particular, multiple wireless power receivers can simultaneously receive energy from the multiple beams of energy and/or the multiple lobes as the wireless power receivers traverse the first designated lane 602 and/or the second designated lane 604 simultaneously.

The example beam pattern shown in FIG. 6C includes a first beam 614 that is broadcast in the first designated lane 602 and a second beam 616 that is broadcast in the second designated lane 604. The first beam 614 can be broadcast in the first designated lane 602 simultaneously with broadcasting of the second beam 616 in the second designated lane 604. Alternatively, the broadcasting of the first beam 614 in the first designated lane 602 and the second beam 616 in the second designated lane 604 can be switched to switch broadcasting of beams of energy in the first and second designated lanes 602 and 604. More specifically, one or more transmitters can switch broadcasting of the first beam 614 and the second beam 616 in the corresponding first and second designated lanes 602 and 604 using time multiplexing of broadcasting. For example, the first beam 614 can be time multiplexed broadcast into the first designated lane 602 as the second beam 616 is not broadcasted according to timed multiplexed broadcasting to effectively switch broadcasting of the first beam 614 and the second beam 616. In turn, this can cause switching of broadcasting of the first beam 614 and the second beam 616 between the first designated lane 602 and the second designated lane 604.

The beam 614 and 616 can be transmitted by one or more wireless power transmitters to wirelessly transmit energy to one or more wireless power receivers. Specifically, the beams 614 and 616 can be transmitted by one or more wireless power transmitters to wirelessly transmit energy to one or more wireless power receivers as the one or more wireless power receivers traverse the first designated lane 602 and the second designated lane 604. More specifically the beams 614 and 616 can be transmitted to positions corresponding to one or more positions of one or more wireless power receivers in the first designated lane 602 and the second designated lane 604 as the one or more wireless power receivers traverse the first designated lane 602 and the second designated lane 604.

One or more wireless power transmitters can be controlled to switch the beams 614 and 616 along the first designated lane 602 and the second designated lane 604. Specifically, one or more wireless power transmitters can be controlled to switch the beams 614 and 616 along the first designated lane 602 and the second designated lane 604 as one or more wireless power receivers move with the beams 614 and 616 while traversing either or both the first designated lane 602 and the second designated lane 604. Alternatively, the one or more wireless power transmitters can be controlled to switch the beams 614 and 616 along the first designated lane 602 and the second designated lane 604 based on a position of one or more wireless power receivers as they traverse either or both the first designated lane 602 and the second designated lane 604. For example the one or more wireless power transmitters can be configured to broadcast the beams 614 and 616 to sweep or otherwise follow one or more wireless power receivers as the wireless power receivers traverse either or both the first designated lane 602 and the second designated lane 604. As follows, wireless power receivers traversing either or both the first designated lane 602 and the second designated lane 604 can be configured to receive the beams 614 and 616 as they traverse the first designated lane 602 and the second designated lane 604.

In various embodiments, one or more wireless power transmitters can switch the beams 614 and 616 between the first designated lane 602 and the second designated lane 604 in response to a lane change request. For example, one or more transmitters can time multiplex broadcasting of the beams 614 and 616 in the first designated lane 602 and the second designated lane 604 in response to a lane change request. This effectively switches broadcasting of the beams 614 and 616 in the first designated lane 602 and the second designated lane 604 in response to a lane change request.

While the beams 614 and 616 are shown to be contained entirely within either the first designated lane 602 or the second designated lane 604, in various embodiments, the beams 614 and 616 can extend to cover, at least part of, the second designated lane 604 or the first designated lane 602. For example, the first beam 614 can include one or more main lobes and/or grating lobes that extend into the second designated lane 604.

Further, as the beams 614 and 616 can each represent more than one beam, one or more transmitters can be configured to broadcast a plurality of beams of energy, represented as the beams 614 and 616 in FIG. 6C, in the first designated lane 602 and/or the second designated lane 604. The plurality of beams of energy can each include multiple lobes that are broadcast in the first designated lane 602 and/or the second designated lane 604. Accordingly, one or more wireless power receivers can receive multiple beams of energy and/or multiple lobes as the wireless power receivers traverse the first designated lane 602 and/or the second designated lane 604. As follows, multiple wireless power receivers can simultaneously receive energy from the multiple beams of energy and/or the multiple lobes as the wireless power receivers traverse the first designated lane 602 and/or the second designated lane 604 simultaneously.

Referring back to the example system 100, shown in FIG. 1, the wireless power transmitter 102 can broadcast one or more beams of energy to the wireless power receiver 104 according to the example beam patterns shown in FIGS. 5A-F and FIGS. 6A-C. Further, the wireless power receiver 104 can receive energy wirelessly through one or more beams of energy broadcast according to the example beam patterns shown in FIGS. 5A-F and FIGS. 6A-C.

As discussed previously, the wireless power transmitter 102 can transmit beams of energy to the wireless power receiver 104 based on a position of the wireless power receiver 104 in the network of interlinked prescribed paths 106. Specifically, the wireless power transmitter 102 can transmit beams of energy to the wireless power receiver 104 based on an actively tracked position of the wireless power receiver 104 as the wireless power receiver 104 traverses the network of interlinked prescribed paths 106. Similarly, the wireless power receiver 104 can receive one or more beams of energy from the wireless power transmitter 102 based on a position of the wireless power receiver 104 in the network of interlinked prescribed paths 106. Specifically, the wireless power receiver 104 can receive one or more beams of energy from the wireless power transmitter 102 based on an actively tracked position of the wireless power receiver 104 as the wireless power receiver 104 traverses the network of interlinked prescribed paths 106.

The wireless power transmitter 102 can actively track a position of the wireless power receiver 104 as the wireless power receiver traverses the network of interlinked prescribed paths 106. Specifically, the wireless power transmitter 102 can actively track a position of the wireless power receiver 104 by communicating with the wireless power receiver 104, e.g. as the wireless power receiver 104 traverses the network of interlinked prescribed paths 106.

The wireless power transmitter 102 can communicate with the wireless power receiver 104 over an auxiliary communication channel, e.g. for actively tracking a position of the wireless power receiver 104. An auxiliary communication channel can include an applicable communication channel separate from one or more beams of energy broadcast by the wireless power transmitter 102 and potentially received at the wireless power receiver 104, e.g. for purposes of wirelessly transferring power. Specifically, an auxiliary communication channel can include an applicable short range wireless communication channel. For example, an auxiliary communication channel can include a WiFi® communication channel, Zigbee® communication channel, Bluetooth® communication channel, or an applicable cellular communication channel. Further, an auxiliary communication channel can include an acoustic communication channel.

In using an auxiliary communication channel with the wireless power receiver 104 to actively track a position of the wireless power receiver 104, the wireless power transmitter 102 can actively track the position of the wireless power receiver 104 using coordinate data. Specifically, the wireless power transmitter 102 can actively track the position of the wireless power receiver 104 using coordinate data of the wireless power receiver 104 that is received from the wireless power receiver 104 over an auxiliary communication channel. More specifically, the wireless power receiver 104 can generate coordinate data and transmit the coordinate data to the wireless power receiver 104 over an auxiliary communication channel. In turn, the wireless power transmitter 102 can actively track a position of the wireless power receiver 104 using the coordinate data. Coordinate data includes applicable data describing a position of the wireless power receiver 104 in space and/or the network of interlinked prescribed paths. Specifically, coordinate data can include global position system (herein referred to as "GPS") data indicating a position of the wireless power receiver 104. For example, the wireless power receiver 104 can include a GPS module for generating GPS coordinate data that the wireless power receiver 104 can then send to the wireless power transmitter 102 through an auxiliary communication channel.

Further, the wireless power transmitter 102 can actively track the position of the wireless power receiver 104 using reflected light from the wireless power receiver 104. Specifically, the wireless power transmitter 102 can actively track the position of the wireless power receiver 104 using light detection and ranging (herein referred to as "LIDAR"). For example, the wireless power transmitter 102 can broadcast light to the wireless power receiver 104 and subsequently identify a position of the wireless power receiver 104 based on the light that is reflected back from the wireless power receiver 104.

Additionally, the wireless power transmitter 102 can actively track the position of the wireless power receiver 104 using reflected radio waves from the wireless power receiver 104. Specifically, the wireless power transmitter 102 can actively track the position of the wireless power receiver 104 using Radar. For example, the wireless power transmitter 102 can broadcast radio waves to the wireless power receiver 104 and subsequently identify a position of the wireless power receiver 104 based on the radio waves that are reflected back from the wireless power receiver 104.

Also, the wireless power transmitter 102 can actively track the position of the wireless power receiver 104 using reflected acoustic waves from the wireless power receiver 104. Specifically, the wireless power transmitter 102 can actively track the position of the wireless power receiver 104 using Sonar. For example, the wireless power transmitter 102 can broadcast acoustic waves to the wireless power receiver 104 and subsequently identify a position of the wireless power receiver 104 based on the acoustic waves that are reflected back from the wireless power receiver 104.

Further, the wireless power transmitter 102 can actively track the position of the wireless power receiver 104 using an optical camera. Specifically, the wireless power transmitter 102 can use an optical camera to estimate a distance between the wireless power receiver 104 and the wireless power transmitter 102, corresponding to a position of the wireless power receiver 104. Additionally, the wireless power transmitter 102 can actively track the position of the wireless power receiver 104 using structured light. Specifically, the wireless power transmitter 102 can project structured light having a known pattern, e.g. broadcast pattern, towards the wireless power receiver 104. Subsequently, an optical camera can detect changes in the pattern of the structured light caused by the wireless power receiver 104. In turn, these changes in the pattern of the structured light can be measured, e.g. based on the known pattern of the structure light, to determine a position of the wireless power receiver 104.

The wireless power transmitter 102 can actively track the position of the wireless power receiver 104 through an implied determination of the position of the wireless power receiver 104. An implied determination of the position of the wireless power receiver 104 can include an estimated position of the wireless power receiver 104. More specifically, the estimated position of the wireless power receiver 104 can include an actual position of the wireless power receiver, not an actual position of the wireless power receiver, or a position that is adjacent to an actual position of the wireless power receiver. An estimated position of the wireless power receiver 104 can be determined using one or a combination of the previously described techniques for tracking a position of the wireless power receiver 104.

The wireless power transmitter 102 can use an implied determination of the position of the wireless power receiver 104 to determine an actual position of the wireless power receiver 104 using a beam of energy broadcast by the wireless power transmitter 102. Specifically, the wireless power transmitter 102 can broadcast a beam of energy, e.g. for wirelessly transferring power, to an estimated position of the wireless power receiver. Subsequently, based on backscattered energy, or a lack thereof, of the beam energy broadcasted to the estimated position, the wireless power transmitter 102 can determine an actual position of the wireless power receiver 104. For example, if the wireless power transmitter 102 does not receive any backscattered energy from the beam of energy, then the wireless power transmitter 102 can determine that the wireless power receiver 104 is not at the estimated location. In another example, if the wireless power transmitter 102 receives backscattered energy from the beam of energy at a specific angle, then the wireless power transmitter 102 can determine the actual position of the wireless power receiver based on the angle at which the backscattered energy is received.

In using an implied determination of the position of the wireless power receiver 104 to determine an actual position of the wireless power receiver 104, the wireless power transmitter 102 can construct a beam that is broadcast to an estimated position of the wireless power receiver 104 based on energy received from the wireless power receiver 104. Specifically, the wireless power transmitter 102 can receive a pilot beam that is broadcast from the wireless power receiver. The wireless power transmitter 102 can then use the pilot beam to broadcast a beam of energy towards the wireless power receiver 104, e.g. to an estimated position of the receiver 104, in order to determine an actual position of the wireless power receiver 104. Specifically, the wireless power transmitter 102 can construct a beam of energy by time-reversing the pilot beam with power to form the beam of energy that points at the estimated position of the wireless power receiver 104.

In transmitting one or more beams of energy based on a position of the wireless power receiver 104, the wireless power transmitter 102 can broadcast the one or more beams of energy based on a received lane change request. Specifically, a lane change request can indicate the wireless power receiver 104 is switching designated lanes in the network of interlinked prescribed paths 106. Subsequently, the wireless power receiver 104 can broadcast the one or more beams of energy to continue to wirelessly transfer energy to the wireless power receiver 104 as it switches the designated lanes. The wireless power transmitter 102 can receive the lane change request from the wireless power receiver 104, e.g. through an auxiliary communication channel. Alternatively and as will be discussed in greater detail later, the wireless power transmitter 102 can received the lane change request from a central control hub for the network of interlinked prescribed paths 106.

FIG. 7 illustrates another example system 700 for transmitting and receiving energy wirelessly. The example system 700 includes a first wireless power transmitter 702 and a second wireless power transmitter 704. Additionally, the example system 700 includes a wireless power receiver 706 traversing a network of interlinked prescribed paths 708. The first wireless power transmitter 702 and the second wireless power transmitter 704 can function according to the wireless power transmitters described herein in transmitting energy wirelessly to the wireless power receiver 706. Specifically, the first wireless power transmitter 702 and the second wireless power transmitter 704 can wirelessly transmit energy to the wireless power receiver 706 as the wireless power receiver 706 traverses the network of interlinked prescribed paths 708. Further, the wireless power receiver 706 can function according to the wireless power receivers described herein in receiving energy wirelessly from the first wireless power transmitter 702 and the second wireless power transmitter 704. Specifically, the wireless power receiver 706 can wirelessly receive energy from the first wireless power transmitter 702 and the second wireless power transmitter 704 as the wireless power receiver 706 traverses the network of interlinked prescribed paths 708.

Either or both the first wireless power transmitter 702 and the second wireless power transmitter 704 can be operatively coupled to the wireless power receiver 706 through a handoff, e.g. between two or more wireless power transmitters. Specifically, the second wireless power transmitter 704 can be operatively coupled to the wireless power receiver 706 through a handoff with the first wireless power transmitter 702. In being operatively coupled to the wireless power receiver 706 through a handoff, either or both the first wireless power transmitter 702 and the second wireless power transmitter 704 can wirelessly transfer energy to the wireless power receiver 706 as part of the handoff. For example, the first wireless power transmitter 702 and the second wireless power transmitter 704 can engage in a handoff. Further in the example, either during or after the handoff, the first wireless power transmitter 702 can stop transmitting wireless energy to the wireless power receiver 706, e.g. by stopping broadcasting of a beam of energy to the wireless power receiver 706. Further, either during or after the handoff, the second wireless power transmitter 704 can begin transmitting wireless energy to the wireless power receiver 706, e.g. by broadcasting a beam of energy to the wireless power receiver 706.

The first wireless power transmitter 702 can correspond to a first prescribed path in the network of interlinked prescribed paths 708. Specifically, the first wireless power transmitter 702 can be configured to wirelessly transfer energy to one or more wireless power transmitters traversing the first prescribed path of the network of interlinked prescribed paths 708. Further, the second wireless power transmitter 704 can correspond to a second prescribed path in the network of interlinked prescribed paths 708. Specifically, the second wireless power transmitter 704 can be configured to wirelessly transfer energy to one or more wireless power transmitters traversing the second prescribed path of the network of interlinked prescribed paths 708. Accordingly, a handoff can occur in coordination with the wireless power receiver 706 switching from the first prescribed path to the second prescribed path in the network of interlinked prescribed paths 708. Specifically, the first wireless power transmitter 702 and the second wireless power transmitter 704 can engage in the handoff so that the first wireless power transmitter 702 stops transmitting wireless energy to the wireless power receiver 706 and the second wireless power transmitter 704 begins transmitting wireless energy to the wireless power receiver 706 as the wireless power receiver 706 leaves the first prescribed path and enters the second prescribed path.

Further, the first wireless power transmitter 702 can correspond to a first designated lane in the network of interlinked prescribed paths 708. Specifically, the first wireless power transmitter 702 can be configured to wirelessly transfer energy to one or more wireless power transmitters traversing the first designated lane of the network of interlinked prescribed paths 708. Further, the second wireless power transmitter 704 can correspond to a second designated lane in the network of interlinked prescribed paths 708. Specifically, the second wireless power transmitter 704 can be configured to wirelessly transfer energy to one or more wireless power transmitters traversing the second designated lane of the network of interlinked prescribed paths 708. Accordingly, a handoff can occur in coordination with the wireless power receiver 706 switching from the first designated lane to the second designated lane in the network of interlinked prescribed paths 708. Specifically, the first wireless power transmitter 702 and the second wireless power transmitter 704 can engage in the handoff so that the first wireless power transmitter 702 stops transmitting wireless energy to the wireless power receiver 706 and the second wireless power transmitter 704 begins transmitting wireless energy to the wireless power receiver 706 as the wireless power receiver 706 leaves the first designated lane and enters the second designated lane.

A handoff between the first wireless power transmitter 702 and the second wireless power transmitter 704 can be coordinated by the first wireless power transmitter 702. In coordinating the handoff between the first wireless power transmitter 702 and the second wireless power transmitter 704, the first wireless power transmitter 702 can communicate with the second wireless power transmitter 704 as part of coordinating and conducting the handoff. Specifically, the first wireless power transmitter 702 can conduct one or more handshakes with the second wireless power transmitter 704 as part of communicating with the second wireless power transmitter 704 as part of the handoff. Further, in coordinating the handoff, the first wireless power transmitter 702 can communicate with the wireless power receiver 706. For example, the first wireless power transmitter 702 can send an acknowledgement to the wireless power receiver 706 indicating that the wireless power receiver 706 will begin receiving energy wirelessly from the second wireless power transmitter 704.

Further, a handoff between the first wireless power transmitter 702 and the second wireless power transmitter 704 can be coordinated by the second wireless power transmitter 704. In coordinating the handoff between the first wireless power transmitter 702 and the second wireless power transmitter 704, the second wireless power transmitter 704 can communicate with the first wireless power transmitter 702 as part of coordinating and conducting the handoff. Specifically, the second wireless power transmitter 704 can conduct one or more handshakes with the first wireless power transmitter 702 as part of communicating with the first wireless power transmitter 702 as part of the handoff. Further, in coordinating the handoff, the second wireless power transmitter 704 can communicate with the wireless power receiver 706. For example, the second wireless power transmitter 704 can send an acknowledgement to the wireless power receiver 706 indicating that the wireless power receiver 706 will begin receiving energy wirelessly from the second wireless power transmitter 704.

Additionally, a handoff between the first wireless power transmitter 702 and the second wireless power transmitter 704 can be coordinated by the wireless power receiver 706. In coordinating the handoff, the wireless power receiver 706 can communicate with either or both the first wireless power transmitter 702 and the second wireless power transmitter 704. Specifically, the wireless power receiver 706 can communicate with either or both the first wireless power transmitter 702 and the second wireless power transmitter 704 to coordinate one or more handshakes between the first wireless power transmitter 702 and the second wireless power transmitter 704. For example, the wireless power receiver 706 can send instructions to the first wireless power transmitter 702 to initiate a handshake with the second wireless power transmitter 704. Further, as will be discussed in greater detail later, the wireless power receiver 706 can communicate with a central control hub for the network of interlinked prescribed paths 108 to coordinate a handoff between the first wireless power transmitter 702 and the second wireless power transmitter 704.

Figure 8:
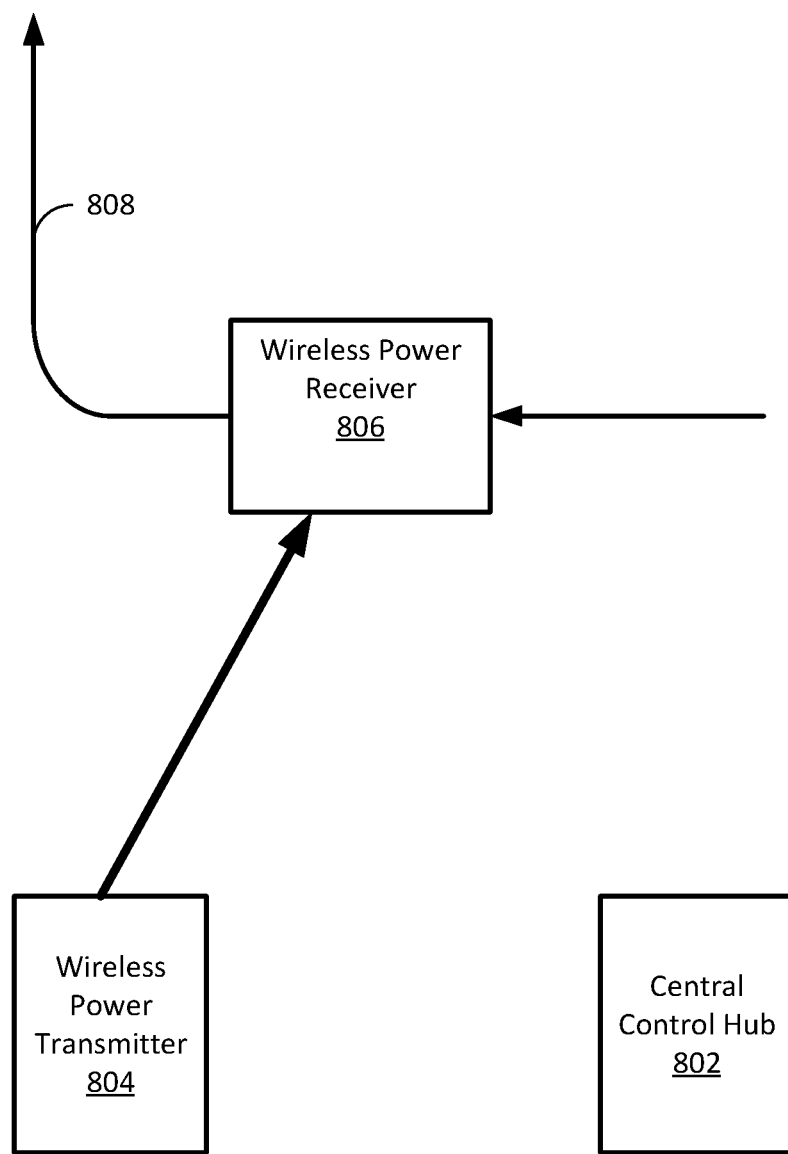
FIG. 8 illustrates an example system for transmitting and receiving energy wirelessly that is managed through a central control hub.

FIG. 8 illustrates an example system 800 for transmitting and receiving energy wirelessly that is managed through a central control hub 802. The example system 800 includes a wireless power transmitter 804. Additionally, the example system 800 includes a wireless power receiver 806 traversing a network of interlinked prescribed paths 808. The wireless power transmitter 804 functions according to the wireless power transmitters described herein in transmitting energy wirelessly to the wireless power receiver 806. Specifically, the wireless power transmitter 802 can wirelessly transmit energy to the wireless power receiver 806 as the wireless power receiver 806 traverses the network of interlinked prescribed paths 808. Further, the wireless power receiver 806 functions according to the wireless power receivers described herein in receiving energy wirelessly from the wireless power transmitter 804. Specifically, the wireless power receiver 806 can wirelessly receive energy from the wireless power transmitter 804 as the wireless power receiver 806 traverses the network of interlinked prescribed paths 808.

The central control hub 802 functions to control, at least in part, wireless transmission of energy to the wireless power receiver 806 through the wireless power transmitter 804. While the example system 800 shown in FIG. 8 includes only a single wireless power transmitter 804, in various embodiments, the system 800 can include a plurality of wireless power transmitters. Specifically, the system 800 can include a plurality of wireless power transmitters that are configured to wirelessly transmit energy to one or more wireless power receivers as the wireless power receivers traverse the network of interlinked prescribed paths 808. More specifically, the central control hub 802 can control the plurality of wireless power transmitters to wirelessly transmit energy to one or more wireless power receivers as they traverse the network of interlinked prescribed paths 808.

In controlling the wireless power transmitter 804 to wirelessly transmit energy, the central control hub 802 can control the wireless power transmitter 804 to broadcast one or more beams of energy to the network of interlinked prescribed paths 808. Specifically, the central control hub 802 can control the wireless power transmitter 804 to broadcast one or more beams of energy to the network of interlinked prescribed paths 808 according to an applicable beam pattern, such as the beam patterns shown in FIGS. 5A-F and FIGS. 6A-C. For example, the central control hub 802 can control the wireless power transmitter 804 to sweep a main lobe of a beam of energy along a prescribed path of the network of interlinked prescribed paths 808. The central control hub 802 can be in communication with the wireless power transmitter 804, e.g. through a network, in order to control the wireless power transmitter for broadcasting one or more beams of energy. For example, the central control hub 802 can be connected to the wireless power transmitter 804 through a wired network. Further in the example, the central control hub 802 can use the wired network to provide control instructions to the wireless power transmitter 804 for controlling broadcasting one or more beams of energy to the network of interlinked prescribed paths 808.

The central control hub 802 can track a position of the wireless power receiver 806 in the network of interlinked prescribed paths 808, e.g. for purposes of controlling the wireless power transmitter 804. Specifically, the central control hub 802 can actively track a position of the wireless power receiver 806 in the network of interlinked prescribed paths 808 as the wireless power receiver 806 traverses the network of interlinked prescribed paths 808. Subsequently, the central control hub 802 can control the wireless power transmitter 804 to broadcast one or more beams of energy to the wireless power receiver 806 as the receiver 806 traverses the network of interlinked prescribed paths 808 based on the determined position of the wireless power receiver 806.

The central control hub 802 can actively track a position of the wireless power receiver 806 using techniques described herein. Specifically, the central control hub 802 can actively track a position of the wireless power receiver 806 using the techniques described with respect to the wireless power transmitter 102 shown in FIG. 1. For example, the central control hub 802 can use Radar to actively track a position of the wireless power receiver 806 in the network of interlinked prescribed paths. Alternatively, the central control hub 802 can actively track a position of the wireless power receiver 806 by communicating with the wireless power receiver 806. For example, the central control hub 802 can receive GPS coordinate data from the wireless power receiver 806 over an auxiliary communication channel to actively track a position of the wireless power receiver 806.

Further the central control hub 802 can actively track a position of the wireless power receiver 806 through one or more wireless power transmitters, e.g. including the wireless power transmitter 804. For example, a plurality of wireless power transmitters can determine a position of the wireless power receiver 806 using LIDAR.

Subsequently, the wireless power transmitters can send position data of the wireless power receiver 806 to the central control hub 802, which can then use the position data received from the wireless power transmitters to track the position of the wireless power receiver 806. In using a plurality of wireless power transmitters to track a position of a wireless power receiver 806, the central control hub 802 can track positions of a plurality of wireless power receivers traversing the network of interlinked prescribed paths 808 at a given time. In turn, the central control hub 802 can use the tracked positions to control wireless power transmitters of the network of interlinked prescribed paths 808 to transmit beams of energy to the plurality of wireless power receivers in the network of interlinked prescribed paths 808, e.g. as the receivers traverse the network of interlinked prescribed paths 808.

The wireless power transmitter 804 can actively track a position of the wireless power receiver 806 through the central control hub 802. Specifically, the central control hub 802 can track a position of the wireless power receiver 806 and generate position data indicating the tracked position of the wireless power receiver 806. Subsequently, the central control hub 802 can provide the position data to the wireless power transmitter 804, which can then use the position data to actively track the position of the wireless power receiver 806. For example, the central control hub 802 can GPS coordinates from the wireless power receiver 806 through an auxiliary communication channel and generate position data based on the GPS coordinates. The central control hub 802 can then provide the position data to the wireless power transmitter 804 which can then actively track the position of the wireless power receiver 806 using the position data received from the central control hub 802.

In controlling the wireless power transmitter 804, the central control hub 802 can generate and/or send lane change requests to the wireless power transmitter 804. For example, the central control hub 802 can receive a lane change request from the wireless power receiver 806. The central control hub 802 can then forward the lane change request to the wireless power transmitter 804. Subsequently, the wireless power transmitter 804 can control transmission of one or more beams of energy based on the lane change request received from the central control hub 802.

Further, in controlling wireless power transmitters, the central control hub 802 can coordinate handoffs between the wireless power transmitters, e.g. including the wireless power transmitter 804. Specifically, the central control hub 802 can instruct one or more wireless power transmitters to perform a handoff as the wireless power receiver 806 traverses the network of interlinked prescribed paths 808. For example, the central control hub 802 can instruct one or more wireless power transmitters to perform one or more handshakes as part of a handoff for transmitting energy wirelessly to the wireless power receiver 806. Further, the central control hub 802 can communicate with the wireless power receiver 806 for purposes of coordinating a handoff between wireless power transmitters. For example, the central control hub 802 can receive, from the wireless power receiver 806, an indication that the wireless power receiver 806 is switching prescribed paths. Subsequently, the central control hub 802 can coordinate a handoff between two wireless power transmitters in response to the wireless power receiver switching the prescribed paths.

Figure 9:
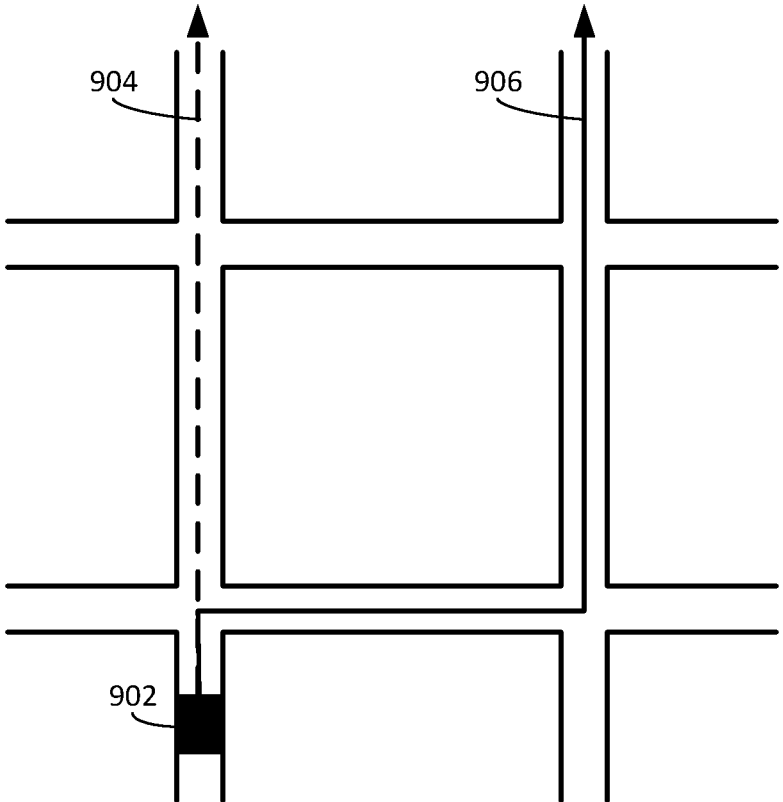
FIG. 9 illustrates an example network of interlinked prescribed paths with routes for traversing the network of interlinked prescribed paths by a wireless power receiver.

FIG. 9 illustrates an example network of interlinked prescribed paths 900 with routes for traversing the network of interlinked prescribed paths 900 by a wireless power receiver 902. Specifically, the wireless power receiver 902 can receive energy wirelessly, such as the wireless power receivers described herein, as it traverses the network of interlinked prescribed paths 900 according to a pre-determined path 904 through the network of interlinked prescribed paths 900. The pre-determined path 904 can be pre-determined based on traffic of wireless power receivers in the network of interlinked prescribed paths 900. For example, the pre-determined path 904 can be a route through the network of interlinked prescribed paths 900 that is pre-determined to be the fastest route through the network of interlinked prescribed paths 900.

In the example network 900 shown in FIG. 9, the wireless power receiver 902 can switch from traversing the network 900 according to the pre-determined path 904 and continue traversing the network 900 according to the modified path 906. The pre-determined path 904 can be modified to create the modified path 906 based on traffic of other wireless power receivers in the network of interlinked prescribed paths 900. Specifically, the pre-determined path 904 can be modified to create the modified path 906 by a central control hub, e.g. based on traffic of other wireless power receiver in the network of interlink prescribed paths 900.

FIG. 10 is a flowchart 1000 of an example method for wirelessly transmitting energy to a wireless power receiver in a network of interlinked prescribed paths. The example method shown in FIG. 10 can be performed within an applicable system for wirelessly transmitting and receiving energy, such as the example systems described herein.

At step 1002, a position of a wireless power receiver in a network of interlinked prescribed paths is tracked. Specifically, a changing position of a wireless power receiver in a network of interlinked prescribed paths can be actively tracked as the wireless power receiver traverses the network of interlinked prescribed paths. A position of a wireless power receiver in a network of interlinked prescribed paths can be tracked using one or more applicable techniques, such as the techniques described herein. For example, a position of a wireless power receiver can be tracked by communicating with the wireless power receiver over an auxiliary communication channel. Further, a position of a wireless power receiver in a network of interlinked prescribed paths can be tracked using either or both one or more wireless power transmitters and a central control hub.

At step 1004, wireless energy is transmitted from one or more wireless power transmitters to the wireless power receiver based on the tracked position of the wireless power receiver in the network of interlinked prescribed paths. In wirelessly transmitting energy to the wireless power receiver based on the position of the wireless power receiver, one or more wireless power transmitters can broadcast one or more beams of energy according to the beam patterns described herein. For example, one or more wireless power transmitters can sweep one or more beams of energy across a prescribed path of a network of interlinked prescribed paths based on a position of the wireless power receiver as it traverses the prescribed path. Further in the example, the one or more wireless power transmitters can sweep the one or more beams of energy to follow the wireless power receiver as it traverses the prescribed path.

FIG. 11 is a flowchart 1100 of an example method for wirelessly receiving energy at a wireless power receiver in a network of interlinked prescribed paths. The example method shown in FIG. 11 can be performed within an applicable system for wirelessly transmitting and receiving energy, such as the example systems described herein.

At step 1102, a position of a wireless power receiver in a network of interlinked prescribed paths is tracked. Specifically, a changing position of a wireless power receiver in a network of interlinked prescribed paths can be actively tracked as the wireless power receiver traverses the network of interlinked prescribed paths. A position of a wireless power receiver in a network of interlinked prescribed paths can be tracked using one or more applicable techniques, such as the techniques described herein. For example, a position of a wireless power receiver can be tracked using Radar. Further, a position of a wireless power receiver in a network of interlinked prescribed paths can be tracked using either or both one or more wireless power transmitters and a central control hub.

At step 1104, wireless energy is received at the wireless power receiver from one or more wireless power transmitters based on the tracked position of the wireless power receiver in the network of interlinked prescribed paths. In wirelessly receiving energy based on the position of the wireless power receiver, the wireless power receiver can receive energy broadcast in one or more beams of energy according to the beam patterns described herein. For example, the wireless power receiver can receive energy from a beam of energy that is swept across a prescribed path of the network of interlinked prescribed paths based on a position of the wireless power receiver as it traverses the prescribed path. Further in the example, the beam can be swept to cover the position the wireless power receiver as the wireless power receiver traverses the prescribed path.

FIG. 12 is a flowchart 1200 of an example method for controlling wireless delivery of energy using a central control hub of a network of interlinked prescribed paths. The example method shown in FIG. 12 can be performed within an applicable system for wirelessly transmitting and receiving energy, such as the example systems described herein.

At step 1202, a position of a wireless power receiver in a network of interlinked prescribed paths is tracked. Specifically, a changing position of a wireless power receiver in a network of interlinked prescribed paths can be actively tracked as the wireless power receiver traverses the network of interlinked prescribed paths. A position of a wireless power receiver in a network of interlinked prescribed paths can be tracked using one or more applicable techniques, such as the techniques described herein. For example, a position of a wireless power receiver can be tracked using Sonar. Further, a position of a wireless power receiver in a network of interlinked prescribed paths can be tracked using either or both one or more wireless power transmitters and a central control hub.

At step 1204, wireless delivery of energy to the wireless power receiver from one or more wireless power transmitters is controlled by a central control hub based on the tracked position of the wireless power receiver in the network of interlinked prescribed paths. In controlling wireless transmission of energy to the wireless power receiver based on the position of the wireless power receiver, a central control hub can control one or more wireless power transmitters to broadcast one or more beams of energy according to the beam patterns described herein. For example, a central control hub can control one or more wireless power transmitters to sweep one or more beams of energy across a prescribed path of a network of interlinked prescribed paths based on a position of the wireless power receiver as it traverses the prescribed path. Further in the example, the central control hub can control the one or more wireless power transmitters to sweep the one or more beams of energy to follow the wireless power receiver as it traverses the prescribed path.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method comprising:
   tracking a position of a wireless power receiver in a network of interlinked prescribed paths as the wireless power receiver traverses one or more prescribed paths in the network of interlinked prescribed paths; and wirelessly receiving energy at the wireless power receiver from one or more wireless power transmitters based on the position of the wireless power receiver in the network of interlinked prescribed paths as the wireless power receiver traverses the one or more prescribed paths in the network of interlinked prescribed paths.

2. The method of claim 1, wherein the network of interlinked prescribed paths are interlinked through two or more prescribed paths that are physically connected.

3. The method of claim 1, wherein the network of interlinked prescribed paths are interlinked through two or more prescribed paths that are physically separated by a gap.

4. The method of claim 1, wherein the wireless power receiver receives the energy through one or more beams of energy broadcast by the one or more wireless power transmitters and each beam of the one or more beams has a corresponding main lobe that sweeps along the one or more prescribed paths in the network of interlinked prescribed paths and the position of the wireless power receiver in the network of interlinked prescribed paths corresponds to one or more positions of the corresponding main lobe of the one or more beams of energy in the one or more prescribed paths as the corresponding main lobe of the one or more beams of energy sweep along the one or more prescribed paths.

5. The method of claim 1, wherein the wireless power receiver receives the energy through one or more beams of energy broadcast by the one or more wireless power transmitters and each beam of the one or more beams has a plurality of grating lobes that sweep along the one or more prescribed paths in the network of interlinked prescribed paths and the position of the wireless power receiver in the network of interlinked prescribed paths corresponds to one or more positions of the corresponding grating lobes of the one or more beams of energy that sweep along the one or more prescribed paths.

6. The method of claim 1, wherein the wireless power receiver receives the energy through one or more beams of energy broadcast by the one or more wireless power transmitters and each beam of the one or more beams has a plurality of lobes that sweep along the one or more prescribed paths in the network of interlinked prescribed paths and the position of the wireless power receiver in the network of interlinked prescribed paths corresponds to one or more positions of corresponding lobes of the plurality of lobes of the one or more beams of energy that sweep along the one or more prescribed paths.

7. The method of claim 1, further comprising:
actively tracking the position of the wireless power receiver in the network of interlinked prescribed paths as the wireless power receiver traverses the one or more prescribed paths by actively determining the position of the wireless power receiver as the position of the wireless power receiver changes while the wireless power receiver traverses the one or more prescribed paths in the network of interlinked prescribed paths; and
wirelessly receiving the energy at the wireless power receiver from the one or more wireless transmitters based on the position of the wireless power receiver actively tracked as the wireless power receiver traverses the one or more prescribed paths.

8. The method of claim 7, wherein the one or more wireless power transmitters actively track the position of the wireless power receiver while the wireless power receiver traverses the one or more prescribed paths in the network of interlinked prescribed paths and wirelessly transmit the energy based on the actively tracked position of the wireless power receiver.

9. The method of claim 8, wherein the one or more wireless transmitters actively track the position of the wireless power receiver through an implied determination of the position by construction of a beam that points at the position.

10. The method of claim 9, wherein the one or more wireless transmitters actively track the position of the wireless power receiver based on backscattered energy from the wireless power receiver of the beam that points at the position.

11. The method of claim 10, wherein the backscattered energy from the wireless power receiver is transmitted by the one or more wireless transmitters through the beam that points at the position.

12. The method of claim 9, wherein the one or more wireless transmitters construct the beam that points at the position from a pilot beam that is received from the wireless power receiver and time-reversed with power to form the beam that points at the position of the wireless receiver.

13. The method of claim 1, wherein a prescribed path of the one or more prescribed paths includes a plurality of designated lanes adjacent to each other and configured to support concurrent traverse of wireless power receivers adjacent to each other.

14. The method of claim 13, wherein the wireless power receiver receives the energy from the one or more wireless power transmitters as the wireless power receiver switches between the plurality of designated lanes of the prescribed path as the wireless power receiver traverses the one or more prescribed paths in the network of interlinked prescribed paths.

15. The method of claim 13, wherein each designated lane of the plurality of designated lanes has a corresponding transmitter of the one or more transmitters and the corresponding transmitter of each designated lane is configured to broadcast a beam of energy along the designated lane.

16. The method of claim 13, wherein the receiver receives energy from a transmitter of the one or more wireless power transmitters broadcasting one or more beams of energy across the plurality of designated lanes.

17. The method of claim 1, wherein the wireless power receiver is operatively coupled to a first wireless power transmitter of the one or more wireless power transmitters through a handoff from a second wireless power transmitter.

18. The method of claim 17, wherein the first wireless power transmitter coordinates the handoff.

19. The method of claim 17, wherein the wireless power receiver coordinates the handoff.

20. The method of claim 17, wherein a central control hub for the network of interlinked prescribed paths coordinates the handoff.

21. The method of claim 1, wherein the wireless power receiver traverses the network of interlinked prescribed paths according to a pre-determined path.

22. The method of claim 21, wherein the pre-determined path is modified as the wireless power receiver traverses the network of interlinked prescribed paths.

23. A system comprising:
a wireless power receiver configured to wirelessly receive energy based on a position of the wireless power receiver in a network of interlinked prescribed paths as the wireless power receiver traverses one or more prescribed paths in the network of interlinked prescribed paths.

24. The system of claim 23, wherein the network of interlinked prescribed paths are interlinked through two or more prescribed paths that are physically connected.

25. The system of claim 23, wherein the network of interlinked prescribed paths are interlinked through two or more prescribed paths that are physically separated by a gap.

26. The system of claim 23, wherein the wireless power receiver is configured to receive the energy through one or more beams of energy broadcast by the one or more wireless power transmitters and each beam of the one or more beams has a corresponding main lobe that sweeps along the one or more prescribed paths in the network of interlinked prescribed paths and the position of the wireless power receiver in the network of interlinked prescribed paths corresponds to one or more positions of the corresponding main lobe of the one or more beams of energy in the one or more prescribed paths as the corresponding main lobe of the one or more beams of energy sweep along the one or more prescribed paths.

27. The system of claim 23, wherein the wireless power receiver is configured to receive the energy through one or more beams of energy broadcast by the one or more wireless power transmitters and each beam of the one or more beams has a plurality of grating lobes that sweep along the one or more prescribed paths in the network of interlinked prescribed paths and the position of the wireless power receiver in the network of interlinked prescribed paths corresponds to one or more positions of the corresponding grating lobes of the one or more beams of energy that sweep along the one or more prescribed paths.

28. The system of claim 23, wherein the wireless power receiver is configured to receive the energy through one or more beams of energy broadcast by the one or more wireless power transmitters and each beam of the one or more beams has a plurality of lobes that sweep along the one or more prescribed paths in the network of interlinked prescribed paths and the position of the wireless power receiver in the network of interlinked prescribed paths corresponds to one or more positions of corresponding lobes of the plurality of lobes of the one or more beams of energy that sweep along the one or more prescribed paths.

29. The system of claim 23, wherein the position of the wireless power receiver is actively tracked in the network of interlinked prescribed paths as the wireless power receiver traverses the one or more prescribed paths by actively determining the position of the wireless power receiver as the position of the wireless power receiver changes while the wireless power receiver traverses the one or more prescribed paths in the network of interlinked prescribed paths and the wireless power receiver is further configured to wireless receive the energy from the one or more wireless transmitters based on the position of the wireless power receiver actively tracked as the wireless power receiver traverses the one or more prescribed paths.

30. The system of claim 29, wherein the one or more wireless power transmitters actively track the position of the wireless power receiver while the wireless power receiver traverses the one or more prescribed paths in the network of interlinked prescribed paths and wirelessly transmit the energy based on the actively tracked position of the wireless power receiver.

31. The system of claim 30, wherein the one or more wireless transmitters actively track the position of the wireless power receiver through an implied determination of the position by construction of a beam that points at the position.

32. The system of claim 31, wherein the one or more wireless transmitters actively track the position of the wireless power receiver based on backscattered energy from the wireless power receiver of the beam that points at the position.

33. The system of claim 32, wherein the backscattered energy from the wireless power receiver is transmitted by the one or more wireless transmitters through the beam that points at the position.

34. The system of claim 31, wherein the one or more wireless transmitters construct the beam that points at the position from a pilot beam that is received from the wireless power receiver and time-reversed with power to form the beam that points at the position of the wireless receiver.

35. The system of claim 30, wherein a prescribed path of the one or more prescribed paths includes a plurality of designated lanes adjacent to each other and configured to support concurrent traverse of wireless power receivers adjacent to each other.

36. The system of claim 35, wherein the wireless power receiver is configured to receive the energy from the one or more wireless power transmitters as the wireless power receiver switches between the plurality of designated lanes of the prescribed path as the wireless power receiver traverses the one or more prescribed paths in the network of interlinked prescribed paths.

37. The system of claim 35, wherein each designated lane of the plurality of designated lanes has a corresponding transmitter of the one or more transmitters and the corresponding transmitter of each designated lane is configured to broadcast a beam of energy along the designated lane.

38. The system of claim 35, wherein the receiver is configured to receive energy from a transmitter of the one or more wireless power transmitters broadcasting one or more beams of energy across the plurality of designated lanes.

39. The system of claim 23, wherein the wireless power receiver is configured to operatively couple to a first wireless power transmitter of the one or more wireless power transmitters through a handoff from a second wireless power transmitter.

40. The system of claim 39, wherein the first wireless power transmitter coordinates the handoff.

41. The system of claim 39, wherein the wireless power receiver is configured to coordinate the handoff.

42. The system of claim 39, wherein a central control hub for the network of interlinked prescribed paths coordinates the handoff.

43. The system of claim 23, wherein the wireless power receiver is configured to traverse the network of interlinked prescribed paths according to a pre-determined path.

* * * * *